US012663747B2

(12) United States Patent
Katahira et al.

(10) Patent No.: US 12,663,747 B2
(45) Date of Patent: Jun. 23, 2026

(54) IMAGE FORMING APPARATUS HAVING SHEET GUIDE MEMBER

(71) Applicant: CANON KABUSHIKI KAISHA, Tokyo (JP)

(72) Inventors: Ko Katahira, Kanagawa (JP); Keita Nakajima, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 107 days.

(21) Appl. No.: 18/644,658

(22) Filed: Apr. 24, 2024

(65) Prior Publication Data

US 2024/0369956 A1 Nov. 7, 2024

(30) Foreign Application Priority Data

May 1, 2023 (JP) ................................. 2023-075872

(51) Int. Cl.
*G03G 15/00* (2006.01)
*G03G 21/16* (2006.01)

(52) U.S. Cl.
CPC ....... *G03G 15/657* (2013.01); *G03G 21/1619* (2013.01); *G03G 2215/00413* (2013.01)

(58) Field of Classification Search
None
See application file for complete search history.

(56) References Cited

U.S. PATENT DOCUMENTS

| | | | | |
|---|---|---|---|---|
| 9,738,478 | B2 | 8/2017 | Makino | |
| 11,548,749 | B2 | 1/2023 | Ikegami et al. | |
| 2020/0209797 | A1* | 7/2020 | Ikegami | G03G 15/6552 |
| 2021/0214180 | A1* | 7/2021 | Ikegami | G03G 21/1633 |
| 2022/0267109 | A1* | 8/2022 | Nakajima | B65H 3/0653 |

FOREIGN PATENT DOCUMENTS

| | | | |
|---|---|---|---|
| JP | 2016185854 | A | 10/2016 |
| JP | 2016194545 | A | 11/2016 |
| JP | 2018118851 | A | 8/2018 |
| JP | 2021109743 | A | 8/2021 |

* cited by examiner

*Primary Examiner* — Leslie J Evanisko
(74) *Attorney, Agent, or Firm* — ROSSI, KIMMS & McDOWELL LLP

(57) ABSTRACT

An image forming apparatus includes a main assembly and an open/close member movable between a first position where it is closed to the main assembly and a second position where it is opened to the main assembly. The main assembly includes a fixing portion, a discharging portion, an intermediary conveying portion provided in a conveyance passage between the fixing portion and the discharging portion and a guide member disposed between the intermediary conveying portion and the discharging portion and movable between a second closed position where it forms a portion of the conveyance passage and a second open position where it opens the portion of the conveyance passage. The guide member is constituted to be movable to the second open position while the open/close member is positioned in the first open position.

15 Claims, 23 Drawing Sheets

IMAGE FORMING APPARATUS HAVING SHEET GUIDE MEMBER

FIELD OF THE INVENTION AND RELATED ART

The present invention relates to an image forming apparatus which forms an image on a sheet.

Conventionally, an image forming apparatus provided with a fixing unit, a conveyance roller pair, and a discharging roller pair, which are disposed along a discharging passage guiding the sheet, on which a toner image is transferred, toward a discharging port (see Japanese Patent Application Laid-Open No. 2016-194545) has been proposed. In the discharging passage, a portion between the conveyance roller pair and the discharging roller pair is formed by a first frame and a second frame opposing the first frame. In the discharging passage, a portion between the fixing unit and the conveyance roller pair is formed by the first frame and a rear cover opposing the first frame.

However, the second frame described in Japanese Patent Application Laid-Open No. 2016-194545 is a fixed component fixed to a main assembly of the image forming apparatus, therefore the discharging passage between the conveyance roller pair and the discharging roller pair cannot be opened. Thus, in a case in which a jam occurs between the conveyance roller pair and the discharging roller pair, there is a possibility that it becomes difficult to clear the jam, and there is a problem in jam clearance performance.

An object of the present invention is to provide an image forming apparatus with improved jam clearance performance.

SUMMARY OF THE INVENTION

An object of the present invention is to provide an image forming apparatus with improved jam clearance performance.

According to an aspect of the present invention, there is provided an image forming apparatus comprising: a main assembly of the image forming apparatus including a transfer portion configured to transfer a toner image onto a sheet; a fixing portion configured to fix the toner image transferred by the transfer portion on the sheet; a discharging portion configured to discharge the sheet on which the toner image is fixed by the fixing portion to an outside of the image forming apparatus; an intermediary conveying portion provided in a conveyance passage through which the sheet is conveyed between the fixing portion and the discharging portion and configured to convey the sheet conveyed from the fixing portion toward the discharging portion; and a guide member disposed between the intermediary conveying portion and the discharging portion and movable between a second closed position where the guide member forms a portion of the conveyance passage and a second open position where the guide member opens the portion of the conveyance passage; and an open/close member movable between a first closed position where the open/close member is closed to the main assembly of the image forming apparatus and a first open position where the open/close member is opened to the main assembly of the image forming apparatus, wherein the guide member is constituted to be movable to the second open position while the open/close member is positioned in the first open position.

Further features of the present invention will become apparent from the following description of exemplary embodiments with reference to the attached drawings.

DESCRIPTION OF THE EMBODIMENTS

Embodiment 1

Overall Configuration

Hereinafter, as an example of an image forming apparatus according to the present invention, an Embodiment in a case in which the present invention is applied to a laser printer of electrophotographic type will be specifically described.

Figure 1:
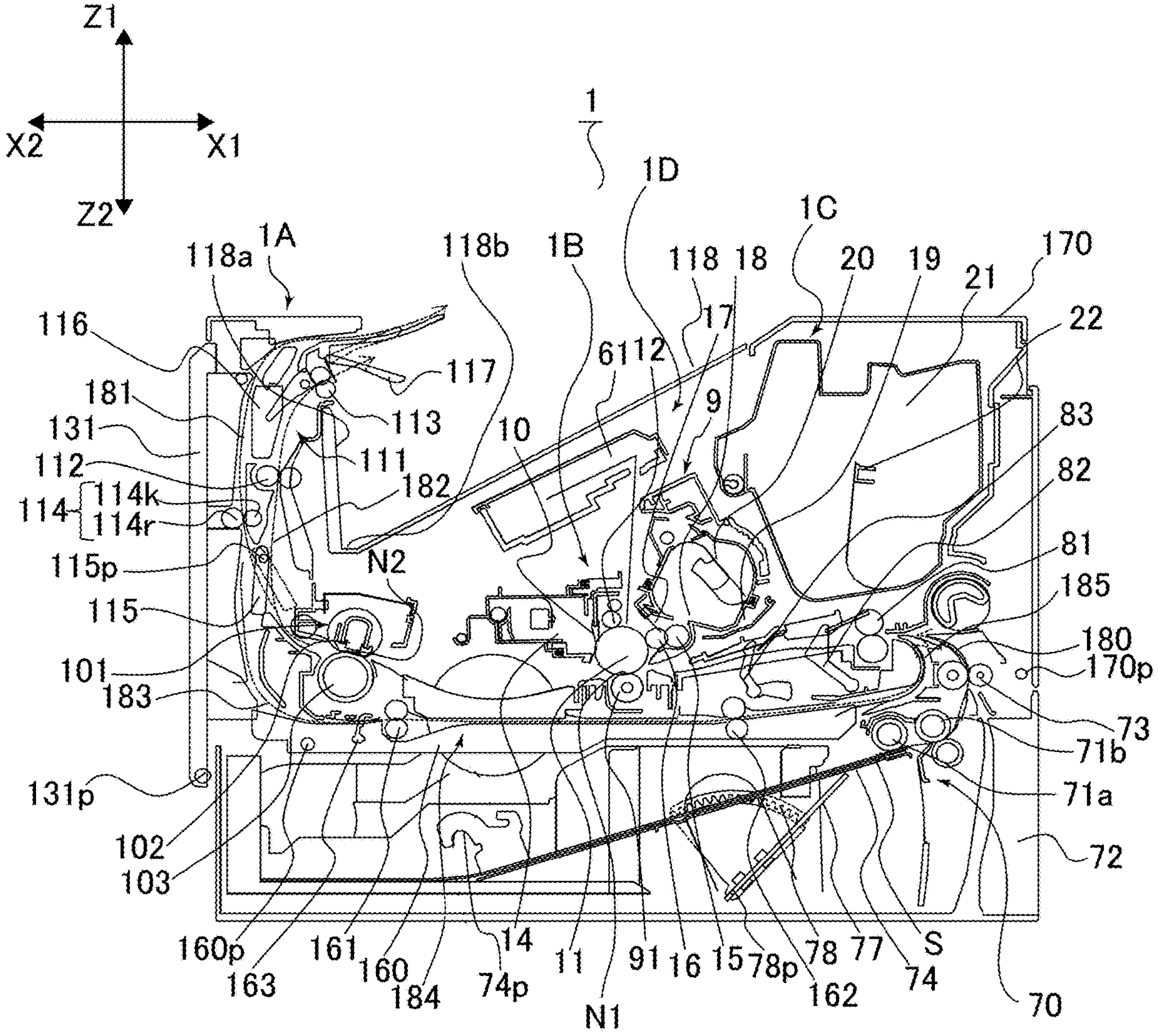
FIG. 1 is a cross-sectional view illustrating an image forming apparatus according to an Embodiment 1.

FIG. 1 is a cross-sectional view illustrating an image forming apparatus according to an Embodiment 1. However, dimensions, material, shape and relative arrangement of components described in Embodiments are not intended to limit the scope of the present invention only to those unless otherwise specified.

Incidentally, the image forming apparatus includes a printer, a copy machine, a facsimile machine and a multifunction machine, and shall refer to any apparatus, which forms an image on a sheet used as a recording media, based on image information input from an external PC or image information read from a document. In addition, there is a case that, to the image forming apparatus, in addition to a main assembly having an image forming function, an accessory apparatus such as an optional feeder, an image reading apparatus, a sheet processing apparatus is connected, and an entire system to which such accessory apparatuses are connected is also one type of the image forming apparatus.

As shown in FIG. 1, an image forming apparatus 1 is constituted by a main assembly of the image forming apparatus 1A, a process cartridge 1B and a toner cartridge 1C. In addition, the process cartridge 1B and the toner cartridge 1C are configured to be mountable to and demountable from the main assembly of the image forming apparatus.

The process cartridge 1B includes a cleaning unit provided with a photosensitive drum 11 and a developing unit 9 provided with a developing roller 16 which bears developer containing toner. The cleaning unit includes the photosensitive drum 11, a cleaning blade 10, a charging roller 12 and a waste toner accommodating portion 14. The charging roller 12 is disposed so as to be in contact with an outer peripheral surface of the photosensitive drum 11, and charges the photosensitive drum 11 by voltage being applied from the main assembly of the image forming apparatus 1A. In addition, the charging roller 12 is rotated driven by the photosensitive drum 11.

The cleaning blade 10 is disposed so as to be in contact with the outer peripheral surface of the photosensitive drum 11 and is a member having elasticity. By a tip of the cleaning blade 10 elastically contacting the photosensitive drum 11, the toner remaining on the photosensitive drum 11 after a toner image is transferred to a sheet S, as described below, is removed. Waste toner, which is the removed toner, is conveyed via the waste toner accommodating portion 14 to the toner cartridge 1C through an unshown waste toner conveyance passage, and is accommodated in an unshown waste toner collecting portion.

The developing unit 9 includes the developing roller 16, a supplying roller 15, a developing blade 17, a developing chamber 18, a toner accommodating chamber 19, and an agitating member 20. The developing roller 16 supplies the toner to a developing area of the photosensitive drum 11. The developing roller 16 then develops an electrostatic latent image formed on the photosensitive drum 11 as the toner image by using the toner. The supplying roller 15 supplies the toner to the developing roller 16. The developing blade 17 is in contact with a peripheral surface of the developing roller 16 and restricts a toner amount adhering to the peripheral surface of the developing roller 16. In addition, the developing blade 17 applies frictional electric charge to the toner.

The toner accommodated in the toner accommodating chamber 19 is fed into the developing chamber 18 by rotation of the agitating member 20 and is supplied to the developing roller 16. The toner in the toner accommodating chamber 19 is detected by an unshown remaining amount detecting portion. When the toner amount in the toner accommodating chamber 19 is equal to or lower than a predetermined amount, the toner is supplied from the toner cartridge 1C to the process cartridge 1B by an unshown supplying portion.

The toner cartridge 1C includes a toner accommodating portion 21 and an agitation conveying unit 22. When the toner is supplied from the toner cartridge 1C to the toner accommodating chamber 19 of the process cartridge 1B, the agitation conveying unit 22 conveys the toner accommodated in the toner accommodating portion 21 toward the unshown supplying portion.

The main assembly of the image forming apparatus 1A includes a sheet feeding portion 70, a transfer roller 91, a laser scanner 61, a fixing portion 101, a discharge reversing unit 111, a double-side conveying unit 184, etc. The laser scanner 61, the transfer roller 91 and the process cartridge 1B constitutes an image forming portion 1D, which forms an image on the sheet S. The sheet feeding portion 70 includes a cassette 72 which is supported by the main assembly of the image forming apparatus 1A so as to be mountable thereto and demountable therefrom, a pickup roller 71*a* and a separating roller pair 71*b*.

Incidentally, the sheet S includes a paper such as a sheet and an envelope, a plastic film such as an overhead projector sheet (OHP), cloth, etc.

The cassette 72 includes a middle plate 74, which supports the sheet S and is provided so as to be ascendable and descendable about a rotational shaft 74*p*, and an ascending/descending arm 77, which is provided so as to be rotatable about a rotational shaft 78*p*. The ascending/descending arm

77 rotates about the rotational shaft 78*p* by an ascending/descending gear 78 rotating. When the ascending/descending arm 77 is rotated above about the rotational shaft 78*p*, the ascending/descending arm 77 lifts the middle plate 74 above about the rotational shaft 74*p*.

The transfer roller 91 as a transfer portion forms a transfer nip N1 with the photosensitive drum 11. The fixing portion 101 includes a heating roller 102, which incorporates a heater, and a pressing roller 103, which forms a fixing nip N2 with the heating roller 102 by being in pressure contact with the heating roller 102.

The discharge reversing unit 111 includes a guide member 115, a discharge conveyance passage 182, an intermediary conveying roller pair 112, a discharging roller pair 113, a full loading detection flag 117, a reverse conveyance passage 181, a reversing roller pair 114, an intermediary conveying guide 116, etc. The guide member 115 as a second guide member is supported so as to be rotatable about a rotational center boss 115*p* and is configured to be rotatable between a discharging position shown by a solid line in FIG. 1 and a reversing position as a fourth closed position shown by a broken line in FIG. 1. When the guide member 115 is positioned in the discharging position, the guide member 115 guides the sheet S conveyed from the fixing portion 101 toward the discharge conveyance passage 182 as a conveyance passage and a first conveyance passage. In addition, when the guide member 115 is in the reversing position, the guide member 115 guides the sheet S conveyed from the fixing portion 101 toward the reverse conveyance passage 181 as a second conveyance passage.

The intermediary conveying roller pair 112 as an intermediary conveying portion is disposed between the fixing portion 101 and the discharging roller pair 113, and conveys the sheet S passing through the discharge conveyance passage 182 toward the discharging roller pair 113 as a discharging portion. The reversing roller pair 114 as a reverse conveying portion is disposed above the guide member 115 and conveys the sheet S conveyed to the reverse conveyance passage 181 once upward and then downward. In other words, the reversing roller pair 114 switches back the sheet S and conveys the sheet S toward the double-side conveying unit 184.

The double-side conveying unit 184 includes a double-side conveyance passage 183 as a third conveyance passage through which the sheet S conveyed from the reverse conveyance passage 181 passes, a double-side conveyance guide 160, a double-side sensor 163, and a conveyance roller pair 161 and 162. The double-side conveyance guide 160 forms at least a portion of the double-side conveyance passage 183 and guides the sheet S. The double-side sensor 163 detects a position of a leading end of the sheet S passing through the double-side conveyance passage 183. The conveyance roller pair 161 and 162 conveys the sheets S passing through the double-side conveyance passage 183. In a downstream end portion in a sheet conveyance direction of the double-side conveyance passage 183, a U-shaped portion 185 curved in U-shape is provided, and the sheet S is conveyed to a registration roller pair 81.

When a command for image formation is input to the image forming apparatus 1, an image forming process by the image forming portion 1D is initiated based on the image information input from the external computer connected to the image forming apparatus 1, etc. The laser scanner 61 irradiates the photosensitive drum 11 with a laser beam based on the input image information. At this time, the photosensitive drum 11 is charged by the charging roller 12 in advance, and the electrostatic latent image is formed on the photosensitive drum 11 by being irradiated with the laser beam. The electrostatic latent image is then developed by the developing roller 16 to form the monochrome toner image on the photosensitive drum 11.

In parallel with the image forming process described above, the sheet S is fed from the sheet feeding portion 70. When the sheet S is fed from the sheet feeding portion 70, the middle plate 74 is rotated above about the rotational shaft 74*p* by the ascending/descending arm 77 being driven. As a result, the sheet S stacked on the middle plate 74 is in contact with the pickup roller 71*a*. In this state, the pickup roller 71*a* and the separating roller pair 71*b* are driven, and the sheet S is fed by the pickup roller 71*a*. In addition, the sheet S fed by the pickup roller 71*a* is separated and conveyed one by one by the separating roller pair 71*b*.

The sheet S separated one by one by the separating roller pair 71*b* is conveyed by a conveyance roller pair 73 through a feed conveyance passage 180 to the registration roller pair 81, and oblique movement is corrected by the registration roller pair 81. In a downstream of the registration roller pair 81 in the sheet conveyance direction, a sheet width sensor 82 and a registration sensor 83 are disposed. The sheet width sensor 82 detects a size in a widthwise direction of the sheet conveyed by the registration roller pair 81 at a predetermined conveyance timing, and the registration sensor 83 detects a position of the leading end of the sheet S. The widthwise direction is a direction perpendicular to the sheet conveyance direction and a thickness direction of the sheet S.

The fixing portion 101 controls the heater incorporated in the heating roller 102 depending on the size in the widthwise direction of the sheet S detected by the sheet width sensor 82. The image forming portion 1D determines a timing for forming the toner image based on the position of the leading end of the sheet S detected by the registration sensor 83.

And onto the sheet S, the toner image on the photosensitive drum 11 is transferred in the transfer nip N1 by electrostatic load bias being applied to the transfer roller 91. The toner remaining on the photosensitive drum 11 is collected by the cleaning blade 10 into the waste toner accommodating portion 14. The sheet S on which the toner image has been transferred is applied with predetermined heat and pressure in the fixing nip portion N2 by the heating roller 102 and the pressing roller 103 of the fixing portion 101 to melt and stick (fix) the toner.

In a case in which the toner image is formed on only one side of the sheet S, the sheet S which has passed through the fixing portion 101 is guided to the discharge conveyance passage 182 by the guide member 115 which is positioned in the discharging position. The sheet S is then conveyed to the discharging roller pair 113 by the intermediary conveying roller pair 112 via the discharge conveyance passage 182. The discharging roller pair 113 discharges the sheet S outside of the image forming apparatus 1, and the sheet S is stacked on a discharge tray 118 formed on an upper surface of the image forming apparatus 1.

Incidentally, when the discharging roller pair 113 discharges the sheet S outside of the image forming apparatus, the full loading detection flag 117 is swung up from a standby position shown by a solid line in FIG. 1 to a position shown by a broken line by being pressed by the sheet S. When a height of the sheets S stacked on the discharge tray 118 reaches a predetermined height, the full loading detection flag 117, which is positioned in the standby position, is in contact with the sheet S stacked on the discharge tray 118. When more sheets S are discharged onto the discharge tray 118 and the full loading detection flag 117 rotates more than a predetermined angle from the standby position, it is determined that the discharge tray 118 is full, and the conveyance of the sheet S by the image forming apparatus 1 is stopped.

In addition, in the present Embodiment, the discharge tray 118 as a stacking surface is inclined downward in a vertical direction (Z direction) as it goes upstream in a discharging direction of the sheet S, which is along an X1 direction. As a result, the sheets S discharged on the discharge tray 118 slide down along the discharge tray 118 and abut to a restricting surface 118*a*. As a result, the sheets S are aligned in the discharging direction.

In addition, in the present Embodiment, a lowest portion 118*b* of the discharge tray 118 in the vertical direction, which is continuous with the restricting surface 118*a*, is positioned lower than the intermediary conveying roller pair 112. Thus, the discharge tray 118 is formed relatively deep so that a large number of sheets S can be stacked thereon. The deeper the discharge tray 118 is formed, the longer the discharge conveyance passage 182 between the fixing portion 101 and the discharging roller pair 113 becomes. However, in the present Embodiment, since the intermediary conveying roller pair 112 is placed between the fixing portion 101 and the discharging roller pair 113, even the smallest size sheet, which the image forming apparatus 1 can convey, can be reliably conveyed through the discharge conveyance passage 182.

In a case in which the toner images are formed on both sides of the sheet S, the guide member 115 is positioned in the reversing position in advance. The sheet S, on which the image has been formed on a first surface and has passed through the fixing portion 101, is guided to the reverse conveyance passage 181 by the guide member 115, which is positioned in the reversing position. In the reverse conveyance passage 181, a reversing roller pair 114, which includes a reverse driving roller 114*r* constituted by a rubber roller, and a reverse driven roller 114*k*, which is rotationally driven by the reverse driving roller 114*r*, is provided. The reversing roller pair 114 is switched in a rotational direction by an unshown rotational direction changing portion at a timing when a trailing end of the sheet S reaches a predetermined position. In addition, the guide member 115 is moved from the reversing position to the discharging position.

By this, the sheet S is switched back in the reverse conveyance passage 181 and guided to the double-side conveyance passage 183 of the double-side conveying unit 184 by the guide member 115, which is positioned in the discharging position. The position of the leading end of the sheet S, which is conveyed to the double-side conveyance passage 183, is detected by the double-side sensor 163. Based on a detection result of the double-side sensor 163, the image forming apparatus 1 recognizes a timing when the sheet S enters the conveyance roller pair 161.

The conveyance roller pair 161 is in a stop state, and the oblique movement is corrected by the sheet S abutting to a nip of the conveyance roller pair 161 in the stop state. The conveyance roller pair 161 is driven after a predetermined time lapses after the double-side sensor 163 detects the position of the leading end of the sheet S. The sheet S is conveyed to the registration roller pair 81 via the U-shaped portion 185 by the conveyance roller pair 161 and 162. Onto a second surface of the sheet S, the toner image is transferred in the transfer nip N1, and the toner image is fixed to the sheet S by the fixing portion 101. The sheet S is then discharged to the discharge tray 118 by the discharging roller pair 113 via the discharge conveyance passage 182.

Figure 4A:
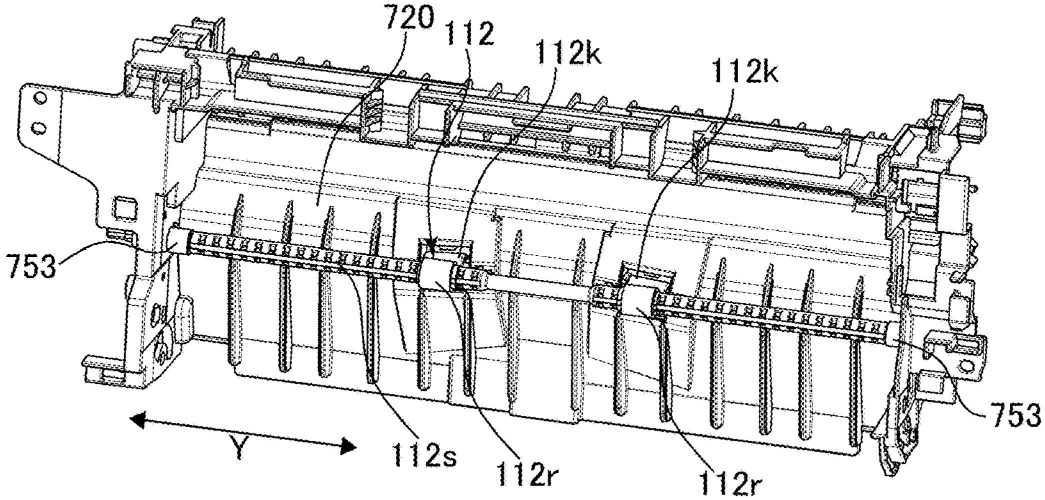
FIG. 4(*a*) is a perspective view illustrating a discharging frame and an intermediary conveying roller pair, FIG. 4(*b*) is a perspective view illustrating the discharging frame and a discharging roller pair, and FIG. 4(*c*) is a perspective view illustrating the discharging frame and a reversing roller pair.
Figure 4B:
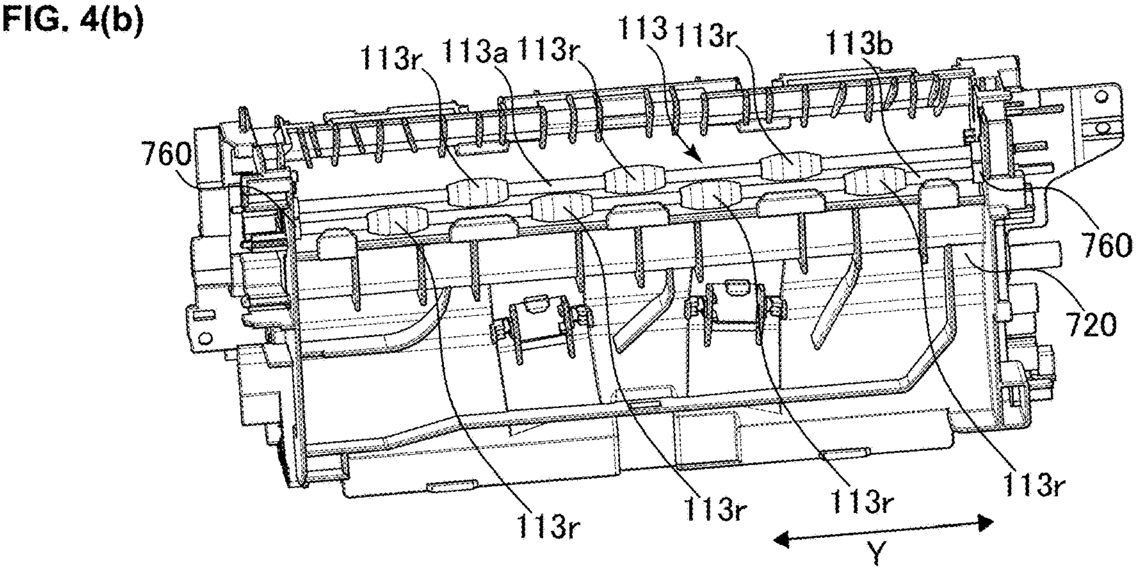
Figure 4C:
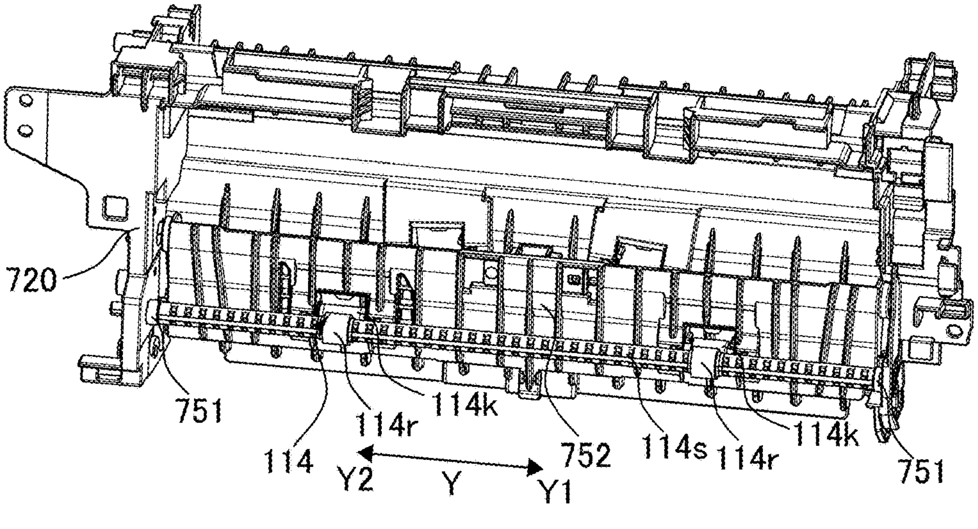

Arrangement of Each Component of the Main Assembly of the Image Forming Apparatus Next, a characteristic arrangement of each component of the main assembly of the image forming apparatus 1A will be described using FIG. 1. As shown in FIG. 1 and FIG. 4(*c*), directions (X1, X2, Y1, Y2, Z1 and Z2) are defined as follows.

A up-down direction is indicated by a Z axis. A direction indicated by an arrow Z1 is an upper direction, and a direction indicated by an arrow Z2 is a down direction. A surface provided at an end of the Z1 direction of the image forming apparatus 1 is referred to as a top surface (upper surface), and a surface provided at an end of the Z2 direction is referred to as a bottom surface (bottom portion, lower portion, lower end). The top surface of the image forming apparatus 1 faces upward (Z1 direction), and the bottom surface faces downward (Z2 direction). The Z1 direction and the Z2 direction may be collectively referred to as the up-down direction, a height direction, the vertical direction, a gravity direction, or the Z direction or a Z axis direction.

A front-back direction is indicated by an X axis. A direction toward an upstream side in a mounting direction when the cassette 72 is mounted on the main assembly 1A of the image forming apparatus 1 is referred to as an X1 direction, and a direction toward a downstream side in the mounting direction is referred to as an X2 direction. For convenience, the X1 direction is defined as a front and the X2 direction is defined as a rear. In other words, a surface provided at an end of the image forming apparatus 1 in the X1 direction is referred to as a front surface (front portion, front end) of the image forming apparatus 1, and a surface provided at an end of the X2 direction is referred to as a rear surface (back surface, rear end, rear portion).

The front surface of the image forming apparatus 1 faces front (X1 direction), and the rear surface faces rear (X2 direction). The X1 direction and the X2 direction may be collectively referred to as a front-back direction, an X direction or an X axis direction.

Furthermore, as shown in FIG. 4 (*c*), a left-right direction of the image forming apparatus 1 is indicated by a Y axis. For convenience, a direction to the left as viewed along the mounting direction (i.e., X2 direction) when the cassette 72 is mounted to the main assembly of the image forming apparatus 1A is indicated by an arrow Y1, and a direction to the right is indicated by an arrow Y2. A surface provided at an end of the image forming apparatus 1 in the Y1 direction is referred to as a left side surface (left surface, left end, left portion), and a surface provided at an end in the Y2 direction is referred to as a right side surface (right surface, right end, right portion). The Y1 direction and the Y2 direction may be collectively referred to as the left-right direction, a lateral direction, the widthwise direction, a Y direction, a Y axis direction, or the like.

The X axis, the Y axis, and the Z axis are perpendicular to each other. For example, the X axis is perpendicular to the Y axis and also to the Z axis. In addition, a plane perpendicular to the X axis may be referred to as a YZ plane, a plane perpendicular to the Y axis a ZX plane, and a plane perpendicular to the Z axis an XY plane. For example, the XY plane is a horizontal plane. The X direction and the Y direction are directions along the XY plane, which is the horizontal plane, that is, horizontal directions.

As shown in FIG. 1, the reversing roller pair 114 is disposed lower than the intermediary conveying roller pair 112 in the Z direction. This is because, by the reversing roller pair 114 being disposed lower, the double-side conveyance passage 183 is shortened and productivity of double-side printing is improved. In addition, the reversing roller pair 114 and the intermediary conveying roller pair 112 are disposed so that at least a portion thereof are overlapped with each other in the X direction. By this, downsizing of the image forming apparatus 1 in the X direction is intended.

The conveyance roller pair 161 and 162 is disposed in a position in which a relatively long sheet, such as A4 size or LTR size, can be conveyed stably through the U-shaped portion 185, which has small curvature and high conveyance resistance. A length in a longitudinal direction of the A4 size is 297 mm, and that of the LTR size is 279.4 mm.

In addition, the conveyance roller pair 161 is disposed in a position away from the reversing roller pair 114 by a distance of only 210 mm or less along the double-side conveyance passage 183. An A5 vertical size, which is the sheet having the smallest size which can be conveyed through the double-side conveyance passage 183, has a length of 210 mm in the longitudinal direction. Since the conveyance roller pair 161 is disposed as described above, the conveyance roller pair 161 can stably convey the sheet of the smallest size conveyed by the reversing roller pair 114 to the double-side conveyance passage 183.

Incidentally, the conveyance roller pair 161 is disposed as close to the fixing portion 101 as possible to increase degree of freedom in arrangement of the reversing roller pair 114 in the Z1 direction. For example, for products with a low capacity of the sheets which can be stacked on the discharge tray 118, the discharging roller pair 113 and the reversing roller pair 114 may be integrated into a single roller pair. In this case, it is possible to realize a configuration which does not require an additional intermediary conveying roller pair to be provided between the reversing roller pair 114 (one roller pair) and the conveyance roller pair 161 in the reverse conveyance passage 181.

In addition, the conveyance roller pair 161 and 162 is disposed so that at least a portion thereof is overlapped with the transfer roller 91 in the Z direction. By this, downsizing of the image forming apparatus 1 is intended.

In addition, at least a portion of the ascending/descending gear 78 is disposed downstream of the conveyance roller pair 162 in the X1 direction. This is due to the following reason. First, the conveyance roller pair 162 is disposed so as to avoid the transfer roller 91, the sheet width sensor 82 and the registration sensor 83. Furthermore, the conveyance roller pair 162 is disposed in a position away from the conveyance roller pair 161 by the distance of only 210 mm or less along the double-side conveyance passage 183. By this, the conveyance roller pair 162 can stably convey the sheet of the smallest size conveyed to the double-side conveyance passage 183.

Next, the ascending/descending gear 78 is disposed so that the rotational shaft 78*p* of the ascending/descending gear 78 is as close to the rotational shaft 74*p* of the middle plate 74 in the X direction as possible. This is to ensure that relationship of an amount of ascending/descending of the middle plate 74 relative to an amount of rotation of the ascending/descending gear 78 does not change as much as possible depending on an amount of the sheets S accommodated in the cassette 72. By this, it becomes possible for the sheet feeding portion 70 to feed the sheet S stably. For the above reasons, the ascending/descending gear 78 and the conveyance roller pair 162 have arrangement relationship as described above.

Configuration for Jam Clearance

Figure 2:
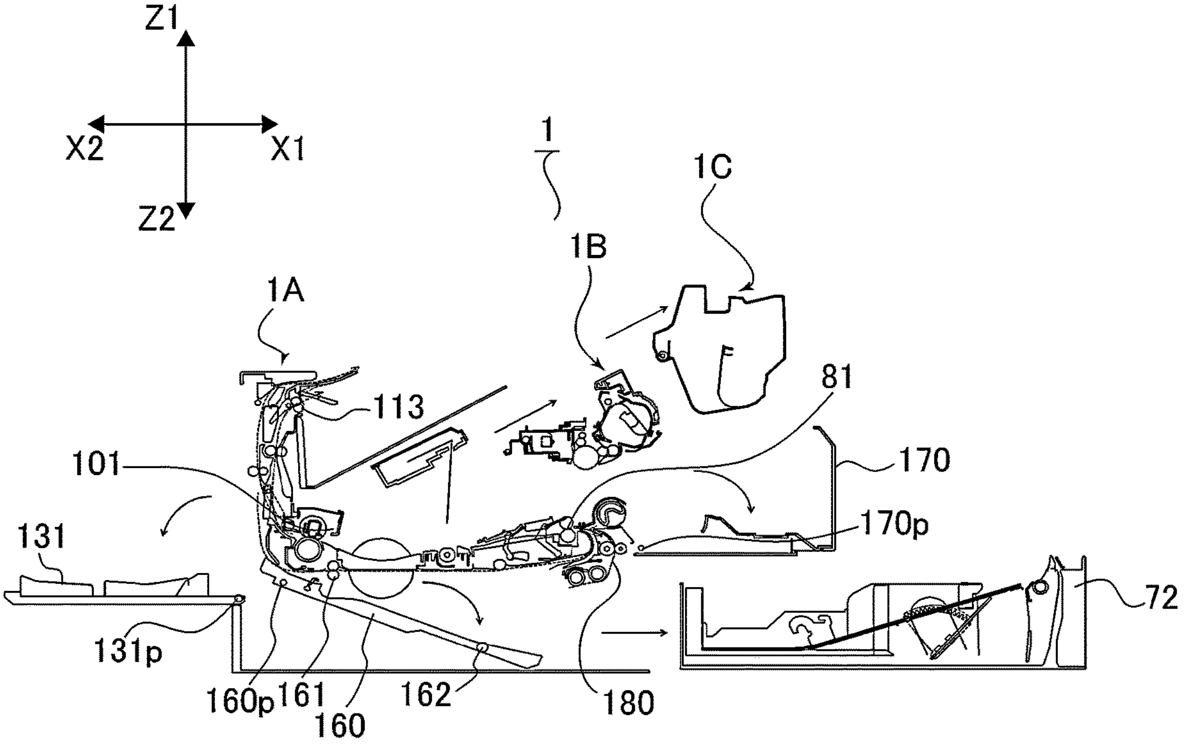
FIG. 2 is a cross-sectional view illustrating the image forming apparatus in a state in which a front door, a rear door and a double-side conveyance guide is opened.

Next, a configuration for clearing the jam when the sheet S is jammed in the main assembly of the image forming apparatus 1A will be described using FIG. 1 and FIG. 2. The image forming apparatus 1 includes a front door 170 and a rear door 131 which are provided so as to be openable and closable to the main assembly of the image forming apparatus 1A, as shown in FIG. 1 and FIG. 2. The front door 170 is provided on the front surface of the image forming apparatus 1 and is rotatable about a rotational center 170*p*. The rear door 131 as an open/close member is provided on the rear surface of the image forming apparatus 1 and is rotatable about a rotational shaft 131*p* as an axis extending in the Y direction (see FIG. 4(*c*)) as a first direction. In addition, the double-side conveyance guide 160 is rotatable about a rotational center 160*p* and can open the double-side conveyance passage 183.

In a case in which the jam occurs in a state in which the leading end of the sheet S is in the feed conveyance passage 180, the user draws out the cassette 72 from the main assembly of the image forming apparatus 1A to the X1 direction. By this, it becomes possible for the user to access the feed conveyance passage 180 and clear the jam.

In a case in which the jam occurs in a state in which the leading end of the sheet S is between the feed conveyance passage 180 and the fixing portion 101, the user opens the front door 170. The user then removes the toner cartridge 1C and the process cartridge 1B from the main assembly of the image forming apparatus 1A. By this, it becomes possible for the user to access the jammed sheet S and clear the jam.

In a case in which the jam occurs in a state in which the leading end of the sheet S is between the fixing portion 101 and the discharging roller pair 113, or in a state in which the leading end of the switched back sheet S is between the fixing portion 101 and the conveyance roller pair 161, the user opens the rear door 131. By this, it becomes possible for the user to access the jammed sheet S and clear the jam.

In a case in which the jam occurs in a state in which the leading end of the sheet S is between the conveyance roller pair 161 and the registration roller pair 81, the user draws out the cassette 72 from the main assembly of the image forming apparatus 1A in the X1 direction. Furthermore, the user opens the double-side conveyance guide 160 downward about the rotational center 160*p* to open the double-side conveyance passage 183. By this, it becomes possible for the user to access the jammed sheet S in the double-side conveyance passage 183 and clear the jam. Incidentally, when the double-side conveyance passage 183 is opened downward, a nip of the conveyance roller pair 162 are separated, but the nip of the conveyance roller pair 161 is not separated. Since it is configured in this manner, the user accessing the double-side conveyance passage 183 from a downstream side in the X1 direction can easily find the jammed sheet S in the double-side conveyance passage 183, and it becomes possible to improve the jam clearance performance.

Configuration of the Discharge Reversing Unit

Figure 3A:
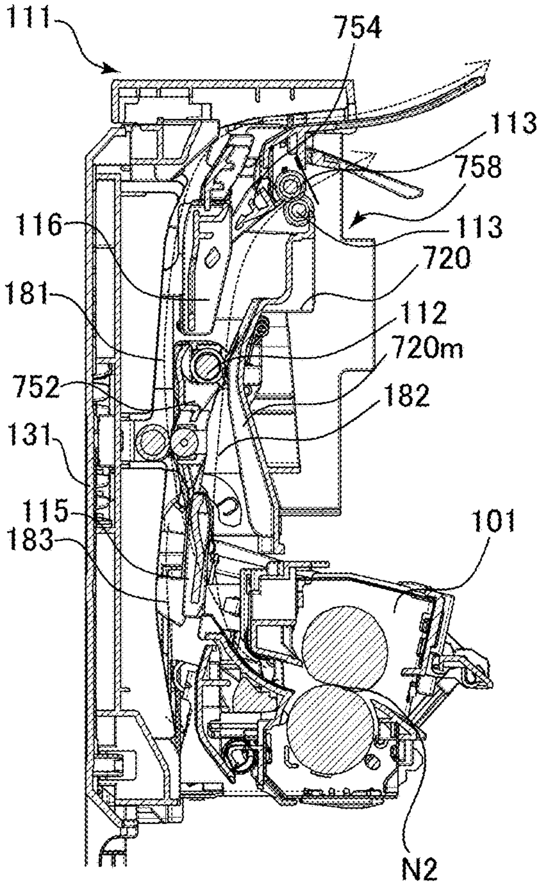
FIG. 3(*a*) is a cross-sectional view illustrating a discharge reversing unit in a state in which a guide member is positioned in a discharging position, and FIG. 3(*b*) is a cross-sectional view illustrating the discharge reversing unit in a state in which the guide member is positioned in a reversing position.
Figure 3B:
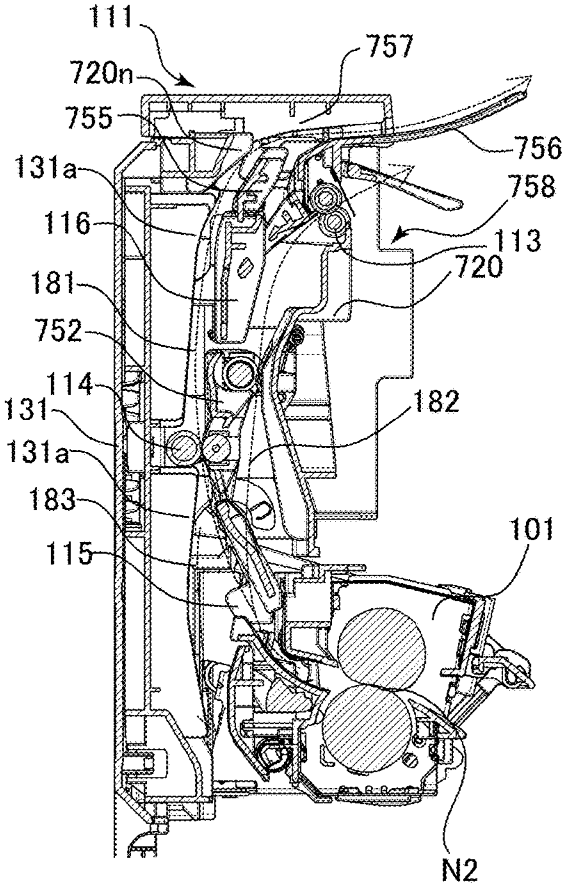

Next, a configuration of the discharge reversing unit 111 will be described using FIGS. 3(*a*) and 3(*b*). Incidentally, in the following description, illustration of fastening members such as screws are omitted. FIG. 3(*a*) is a cross-sectional view illustrating the discharge reversing unit 111 in a state in which the guide member 115 is positioned in the discharging position, and FIG. 3(*b*) is a cross-sectional view of the discharge reversing unit 111 in a state in which the guide member 115 is positioned in the reversing position.

As shown in FIG. 3(*a*), in the discharge conveyance passage 182, through which the sheet S guided by the guide member 115 positioned in the discharging position passes, the intermediary conveying roller pair 112 and the discharging roller pair 113 are disposed. The intermediary conveying roller pair 112 is disposed between the fixing nip N2 and the discharging roller pair 113 to convey the shorter sheet than a distance from the fixing nip N2 to a nip of the discharging roller pair 113.

The discharge conveyance passage 182 is formed by the guide member 152, an intermediary guide 752, the intermediary conveying guide 116, a discharging guide 754, and a first guide portion 720*m* of a discharging frame 720. The guide member 152, the intermediary guide 752, the intermediary conveying guide 116 and the discharging guide 754 are opposing to the first guide portion 720*m* of the discharging frame 720 and are supported by the discharging frame 720.

As shown in FIG. 3(*b*), in the reverse conveyance passage 181, through which the sheet S guided by the guide member 115 positioned in the reversing position passes, the reversing roller pair 114 is disposed. The reverse conveyance passage 181 is formed by the guide member 115, the intermediary guide 752, the intermediary conveying guide 116, a reversing guide 755, a reversing tray 756, a second guide portion 720*n* of the discharging frame 720, a rear door guide 131*a* of the rear door 131 and a top cover 757. The guide member 115, the intermediary guide 752, the intermediary conveying guide 116, the reversing guide 755 and the reversing tray 756 are provided on one side of the reverse conveyance passage 181. The second guide portion 720*n* of the discharging frame 720, the rear door guide 131*a* of the rear door 131, and the top cover 757 are provided on the other side of the reverse conveyance passage 181.

The guide member 152, the intermediary guide 752, the intermediary conveying guide 116, the discharging guide 754, the reversing guide 755 and the reversing tray 756 described above are attached to the discharging frame 720, which is fixed to an unshown apparatus frame. And the guide member 152, the intermediary guide 752, the intermediary conveying guide 116, the discharging guide 754, the reversing guide 755, the reversing tray 756 and the discharging frame 720 constitute a discharging unit 758. That is, the discharge conveyance passage 182 is formed by the discharging unit 758, and the reverse conveyance passage 181 is formed by the discharging unit 758, the rear door 131 and the top cover 757.

In addition, the guide member 115, the intermediary guide 752 and the intermediary conveying guide 116 are disposed so as to be sandwiched between the above discharge conveyance passage 182 and the reverse conveyance passage 181, and one side thereof forms the discharge conveyance passage 182 and the other side thereof forms the reverse conveyance passage 181, respectively. Incidentally, in the present Embodiment, the rear door guide 131*a*, which constitutes the reverse conveyance passage 181, is constituted by a separate component from the rear door 131, however, the rear door guide 131*a* may be formed integrally with the rear door 131.

Configuration of Each Roller Pair

Next, a configuration of the intermediary conveying roller pair 112, the discharging roller pair 113, and the reversing roller pair 114 will be described using part (a), FIGS. 4(*b*) and 4(*c*). FIG. 4(*a*) is a perspective view illustrating the discharging frame 720 and the intermediary conveying roller pair 112. FIG. 4(*b*) is a perspective view illustrating the discharging frame 720 and the discharging roller pair 113. FIG. 4(*c*) is a perspective view illustrating the discharging frame 720 and the reversing roller pair 114.

As shown in FIG. 4(*a*), the intermediary conveying roller pair 112 includes an intermediary driving roller 112*r*, which is constituted by rubber rollers, and an intermediary driven roller 112*k*, which is rotationally driven by the intermediary driving roller 112*r*. In the present Embodiment, two pairs of the intermediary driving roller 112*r* and the intermediary driven roller 112*k* are provided. The discharging frame 720 supports a roller shaft 112*s* rotatably via a bearing 753, and to the roller shaft 112*s*, the intermediary driving roller 112*r* is attached. The intermediary driven roller 112*k* is rotationally supported by the discharging frame 720 and forms a nip by being in contact with the intermediary driving roller 112*r*.

As shown in FIG. 4(*b*), the discharging roller pair 113 includes a discharging upper roller 113*a* and a discharging lower roller 113*b*. In the present Embodiment, the discharging upper roller 113*a* includes three rubber rollers 113*r* which are aligned in the Y direction (widthwise direction), and the discharging lower roller 113*b* includes four rubber rollers 113*r* which are aligned in the Y direction. These rubber rollers 113*r* of the discharging upper roller 113*a* and the rubber roller 113*r* of the discharging lower roller 113*b* are supported via a bearing 760 so as to be rotatable with respect to the supporting frame 720.

The rubber rollers 113*r* of the discharging upper roller 113*a* and the rubber rollers 113*r* of the discharging lower roller 113*b* are disposed so that portions thereof are overlapped each other as viewed in the Y direction, and disposed so as to be offset in the Y direction. By the discharging upper roller 113*a* and the discharging lower roller 113*b* being constituted in this manner, the sheet S discharged by the discharging roller pair 113 is deformed as waving as viewed in the sheet conveyance direction and stiffened. As a result, for the sheet S discharged by the discharging roller pair 113 toward the discharge tray 118, it is suppressed that the leading end side thereof hangs down in the gravity direction, and is smoothly discharged to the discharge tray 118. Therefore, for example, it is possible to reduce a possibility for the sheet S to become discharging defect by the leading end of the sheet S being abutted to the discharge tray 118.

As shown in FIG. 4(*c*), the reversing roller pair 114 includes the reverse driving roller 114*r*, which is constituted by rubber rollers, and the reverse driven roller 114*k*, which is rotationally driven by the reverse driving roller 114*r*. In the present Embodiment, two pairs of the reverse driving roller 114*r* and the reverse driven roller 114*k* are provided. The discharging frame 720 rotatably supports a roller shaft 114*s* via a bearing 751, and to the roller shaft 114*s*, the reverse driving roller 114*r* is attached. The reverse driven roller 114*k* is rotatably supported by the intermediary guide 752, which is fixed to the discharging frame 720, and forms a nip by being in contact with the reverse driving roller 114*r*.

Configuration for Opening the Discharge Conveyance Passage

Figure 5A:
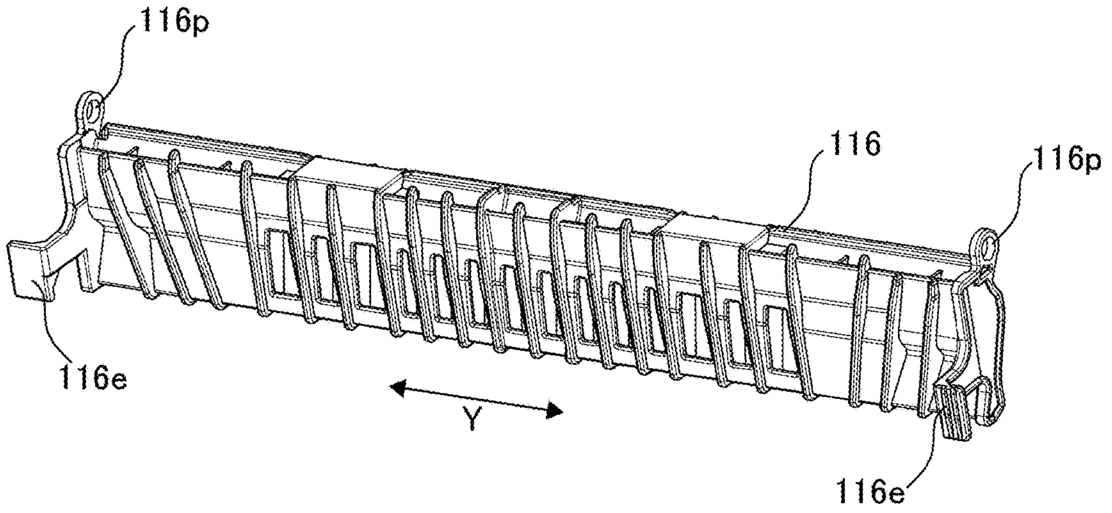
FIG. 5(*a*) is a perspective view illustrating an intermediary conveying guide, and FIG. 5(*b*) is a side view illustrating the intermediary conveying guide positioned in a guiding position.
Figure 5B:
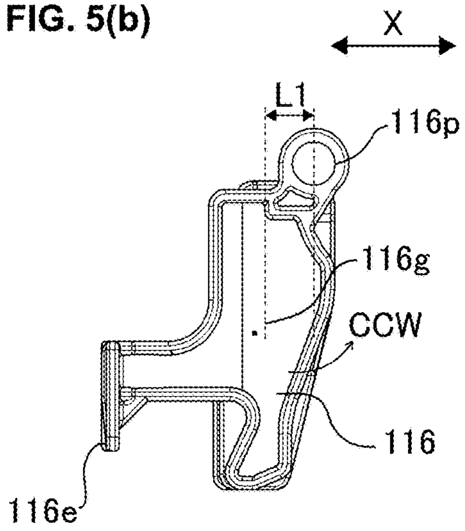
Figure 6:
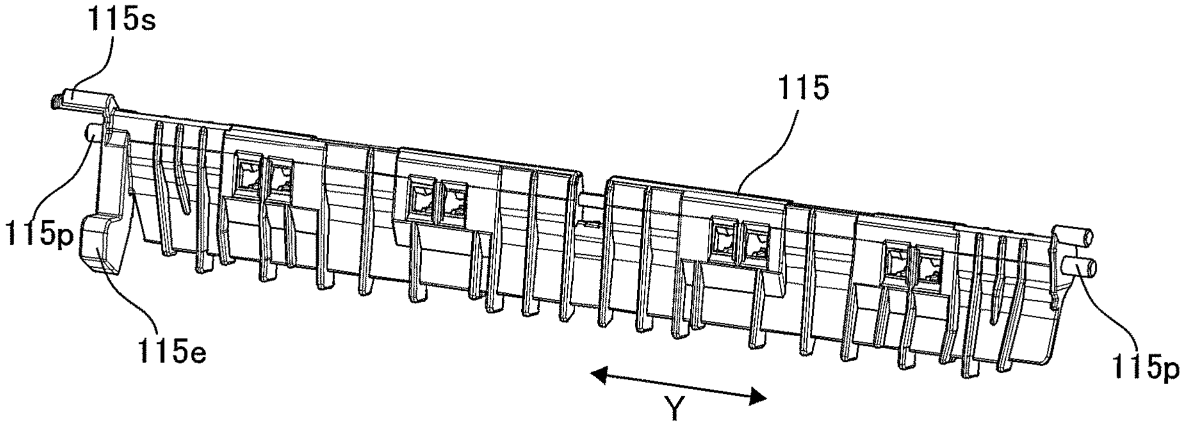
FIG. 6 is a perspective view illustrating the guide member.
Figure 7A:
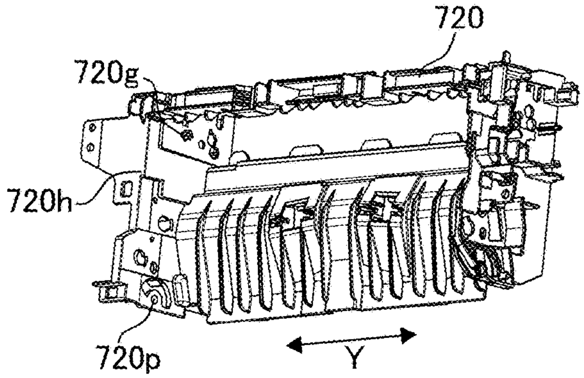
FIG. 7(*a*) is a perspective view illustrating the discharging frame, FIG. 7(*b*) is another perspective view illustrating the discharging frame, and FIG. 7(*c*) is a side view illustrating the discharging frame.
Figure 7B:
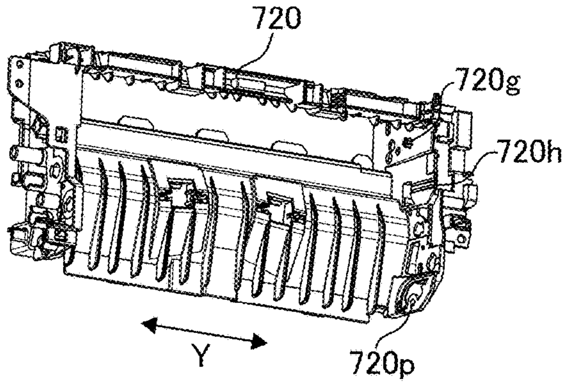
Figure 7C:
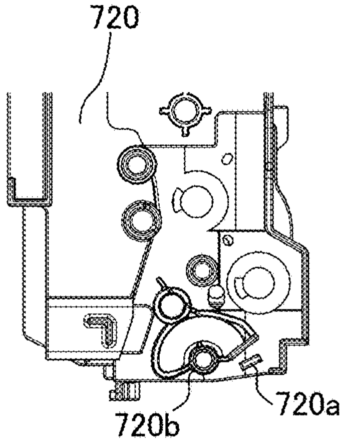
Figure 8:
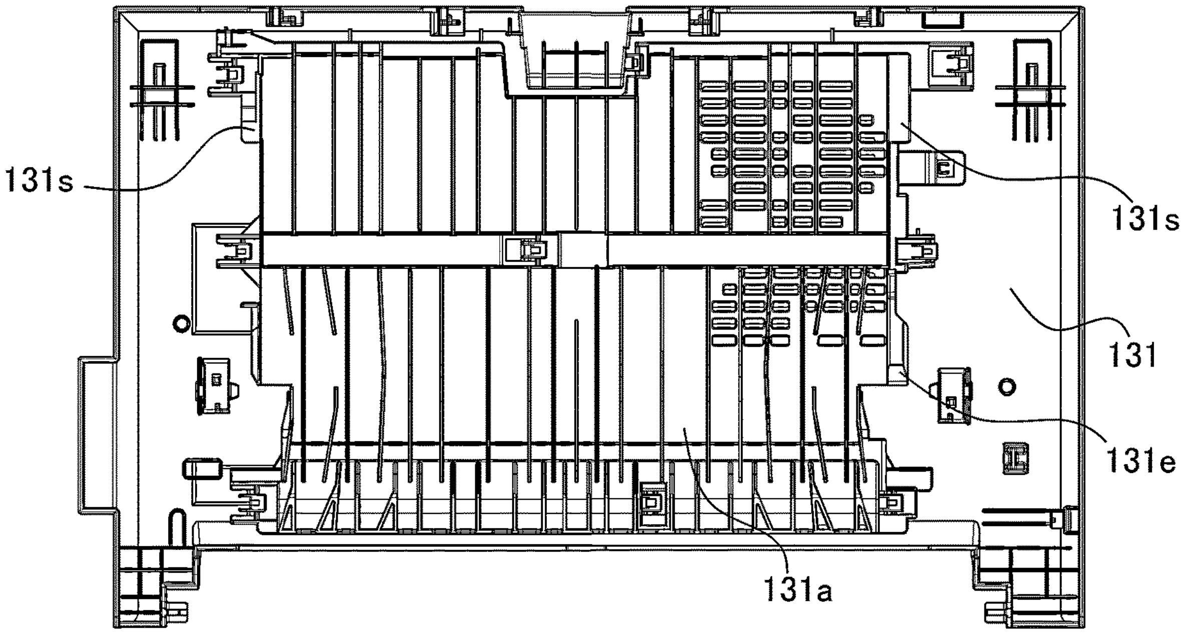
FIG. 8 is a front view illustrating the rear door.
Figure 9A:
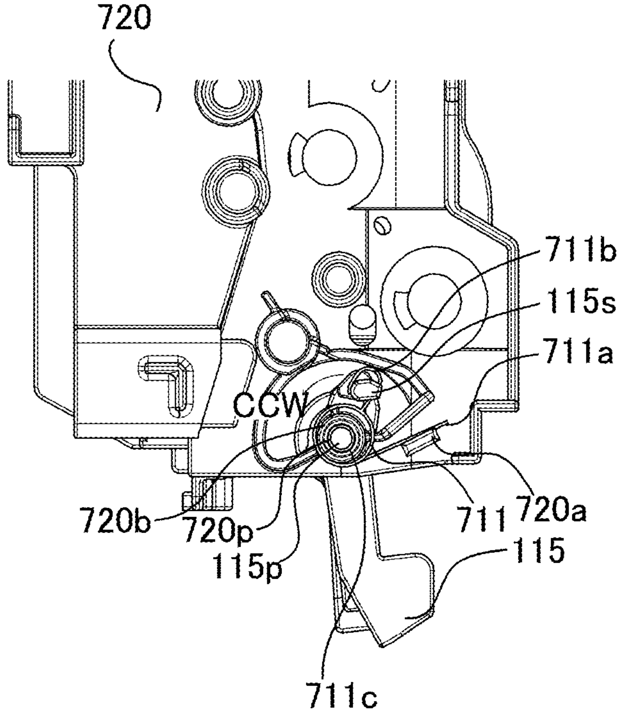
FIG. 9(*a*) is a side view illustrating the guide member and the discharging frame positioned in the discharging position, and FIG. 9(*b*) is a side view illustrating the guide member and the discharging frame positioned in the reversing position.
Figure 9B:
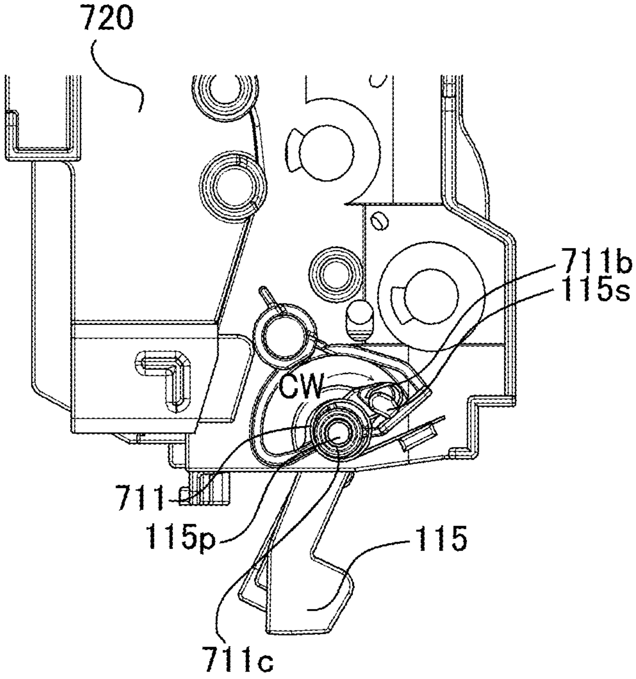

Next, a configuration for opening the discharge conveyance passage 182 will be described using FIG. 5(*s*) through FIG. 9(*b*). FIG. 5(*a*) is a perspective view illustrating the intermediary conveying guide 116, and FIG. 5(*b*) is a side view illustrating the intermediary conveying guide 116 positioned in a guiding position. FIG. 6 is a perspective view illustrating the guide member 115. FIG. 7(*a*) is a perspective view illustrating the discharging frame 720, and FIG. 7(*b*) is another perspective view illustrating the discharging frame 720. FIG. 7(*c*) is a side view illustrating the discharging frame 720. FIG. 8 is a front view illustrating the rear door 131. FIG. 9(*s*) is a side view illustrating the guide member 115 and the discharging frame 720 positioned in the discharging position, and FIG. 9(*b*) is a side view illustrating the guide member 115 and the discharging frame 720 positioned in the reversing position.

As shown in FIG. 5(*a*), the intermediary conveying guide 116 as the guide member and a first guide member is configured to be rotatable about a rotational center hole 116*p* as a rotational center with respect to the discharging frame 720 (see FIG. 3(*a*)). In addition, the intermediary conveying guide 116 includes a rotation stop portion 116*e*, and is positioned in the guiding position as a second closed position (position shown in FIGS. 3(*a*) and 3(*b*)) by the rotation stop portion 116*e* being sandwiched by the discharging frame 720 and the rear door guide 131*a*. The intermediary conveying guide 116 guides the sheet S passing through the discharge conveyance passage 182 or the reverse conveyance passage 181 in the guiding position. Incidentally, the rotational center hole 116*p* and the rotation stop portion 116*e* are provided at both end portions of the intermediary conveying guide 116 in the Y direction.

As shown in FIG. 5(*b*), in a state in which the intermediary conveying guide 116 is positioned in the guiding position, the rotational center hole 116*p* is disposed above a center of gravity 116*g* of the intermediary conveying guide 116 in the vertical direction. In addition, the rotational center hole 116*p* and the center of gravity 116*g* of the intermediary conveying guide 116 are positioned at different positions in the X direction (front-back direction). More specifically, a center of the rotational center hole 116*p* and the center of gravity 116*g* are separated by a distance L1 in the X direction. In other words, the rotational center hole 116*p* is disposed at a farther position from the rear door 131 than the center of gravity 116*g* of the intermediary conveying guide 116 in the X direction as a second direction in a state in which the rear door 131 is in a closed position.

The intermediary conveying guide 116 moves so that the rotational center hole 116*p* and the center of gravity 116*g* overlap in the X direction in a natural state, that is, in a state in which no external force is acting on the intermediary conveying guide 116.

In other words, the intermediary conveying guide 116 rotates so that the distance L1 becomes 0. Therefore, in a state in which the intermediary conveying guide 116 is attached to the discharging frame 720 and held in the guiding position, on the intermediary conveying guide 116, due to its own weight, rotational force to rotate the intermediary conveying guide 116 in a CCW (counterclockwise) direction about the rotational center hole 116*p* is acting.

As shown in FIG. 6, the guide member 115 is configured to be rotatable about the rotational center boss 115*p* as a rotational center with respect to the discharging frame 720 (see FIG. 3(*a*)). In addition, the guide member 115 includes a rotation restricted portion 115*e* and a pressed portion 115*s*, and rotation is stopped by the rotation restricted portion 115*e* being abutted to the rear door guide 131*a*. Incidentally, the rotational center boss 115*p* is provided at both end portions of the guide member 115 in the Y direction. The pressed portion 115*s* is pressed by an acting arm 711*b* of a spring 711 described below. As a result, the guide member 115 is urged in the discharging position.

As shown in FIGS. 7(*a*) and 7(*b*), the discharging frame 720 includes a rotational center boss 720*g*, an abutting portion 720*h* and a rotational center hole 720*p*. The rotational center boss 720*g* is inserted into the rotational center hole 116*p* of the intermediary conveying guide 116. As a result, the intermediary conveying guide 116 is supported rotatably about the rotational center boss 720*g* and the rotational center hole 116*p* with respect to the discharging frame 720.

The abutting portion 720*h* and the rear door guide 131*a* sandwich the rotation stop portion 116*e* of the intermediary conveying guide 116. As a result, the intermediary conveying guide 116 is rotationally stopped in the guiding position. Into the rotational center hole 720*p*, the rotational center boss 115*p* of the guide member 115 is inserted. As a result, the guide member 115 is supported rotatably about the rotational center boss 115*p* and the rotational center hole 720*p* with respect to the discharging frame 720. Incidentally, the rotational center boss 720*g*, the abutting portion 720*h* and the rotational center hole 720*p* are provided at both end portions of the discharging frame 720 in the Y direction.

Furthermore, as shown in FIG. 7(*c*) and FIG. 9(*a*), the discharging frame 720 includes a boss portion 720*b*, to which a coil portion 711*c* of the spring 711 constituted by a coil spring is attached, and a supporting portion 720*a*, which holds a fixing arm 711*a* of the spring 711.

As shown in FIG. 8, the rear door guide 131*a* provided in the rear door 131 includes rotation restricting portions 131*s* and 131*e*. The rotation restricting portion 131*s*, together with the abutting portion 720*h* of the discharging frame 720, sandwiches the rotation stop portion 116*e* of the intermediary conveying guide 116. As a result, the intermediary conveying guide 116 is rotationally stopped in the guiding position. The rotation restricting portion 131*e* restricts rotation of the guide member 115 by being in contact with the guide member 115, which is urged by the spring 711.

As shown in FIG. 9(*a*), the guide member 115 is supported rotatably with respect to the discharging frame 720 by the rotational center boss 115*p* engaging with the rotational center hole 720*p* of the discharging frame 720. The coil portion 711*c* of the spring 711 is inserted into the boss portion 720*b*, which is provided coaxially with the rotational center boss 115*p* and the rotational center hole 720*p*. In addition, the guide member 115 is urged in the CCW direction about the rotational center boss 115*p* by the pressed portion 115*s* being pressed by the acting arm 711*b* of the spring 711. In other words, the guide member 115 is urged to the discharging position shown in FIG. 9(*a*) by the spring 711 as a second guide urging member. The guide member 115 guides the sheet S to the discharge conveyance passage 182 in the discharging position.

When the guide member 115 rotates from the discharging position to the reversing position shown in FIG. 9(*b*), force in a CW (clockwise) direction is applied from an unshown switching portion to the pressed portion 115*s*. The force in the CW direction applied from the switching portion to the pressed portion 115*s* is greater than the urging force in the CCW direction by the spring 711. Therefore, the guide member 115 rotates in the CW direction about the rotational center boss 115*p* and is moved in the reversing position by the force in the CW direction being applied to the pressed portion 115*s*. Incidentally, the force in the CW direction applied from the switching portion to the pressed portion 115*s* is greater than the urging force in the CCW direction by the spring 711, even when the guide member 115 is positioned in the reversing position. Thus, the guide member is maintained in the reversing position where the guide member guides the sheet S to the reverse conveyance passage 181. In addition, when the force in the CW direction applied from the switching portion to the pressed portion 115*s* is no longer present, the guide member 115 returns to the discharging position by the urging force of the spring 711.

Operation to Open the Discharge Conveyance Passage

Figure 10:
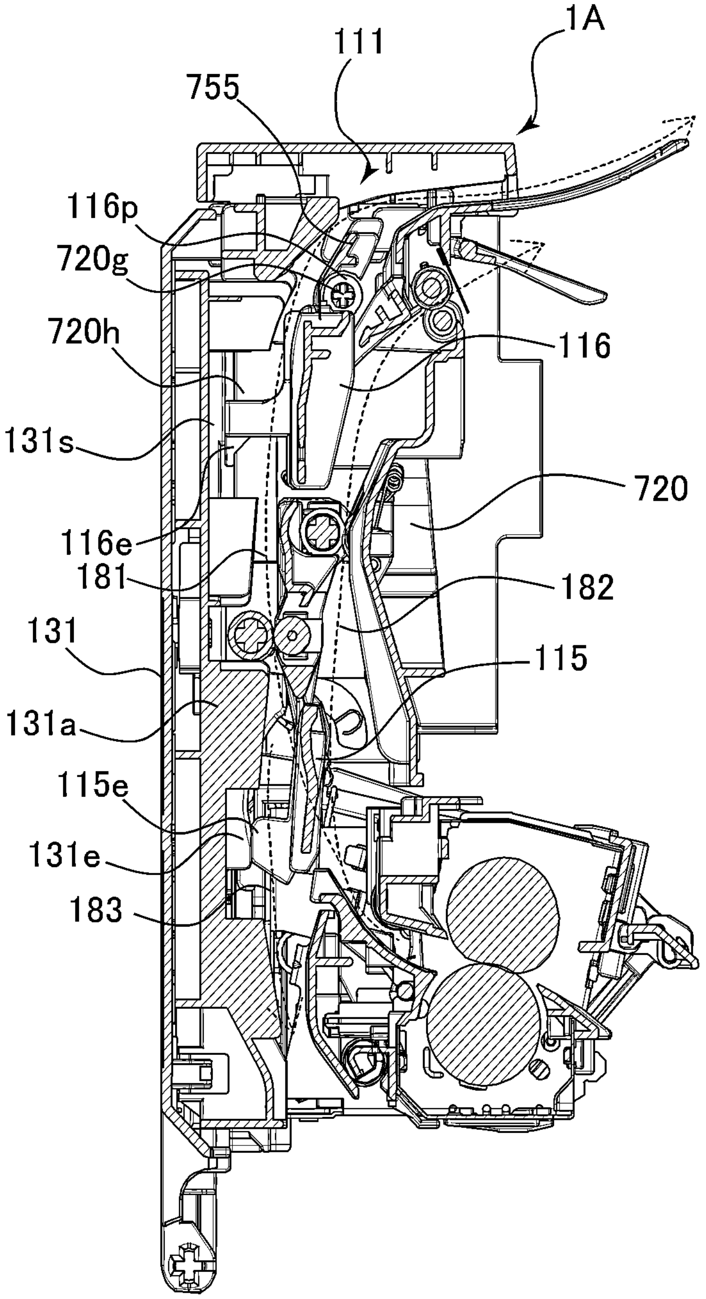
FIG. 10 is a cross-sectional view illustrating the discharge reversing unit in a state in which the rear door is closed.
Figure 11:
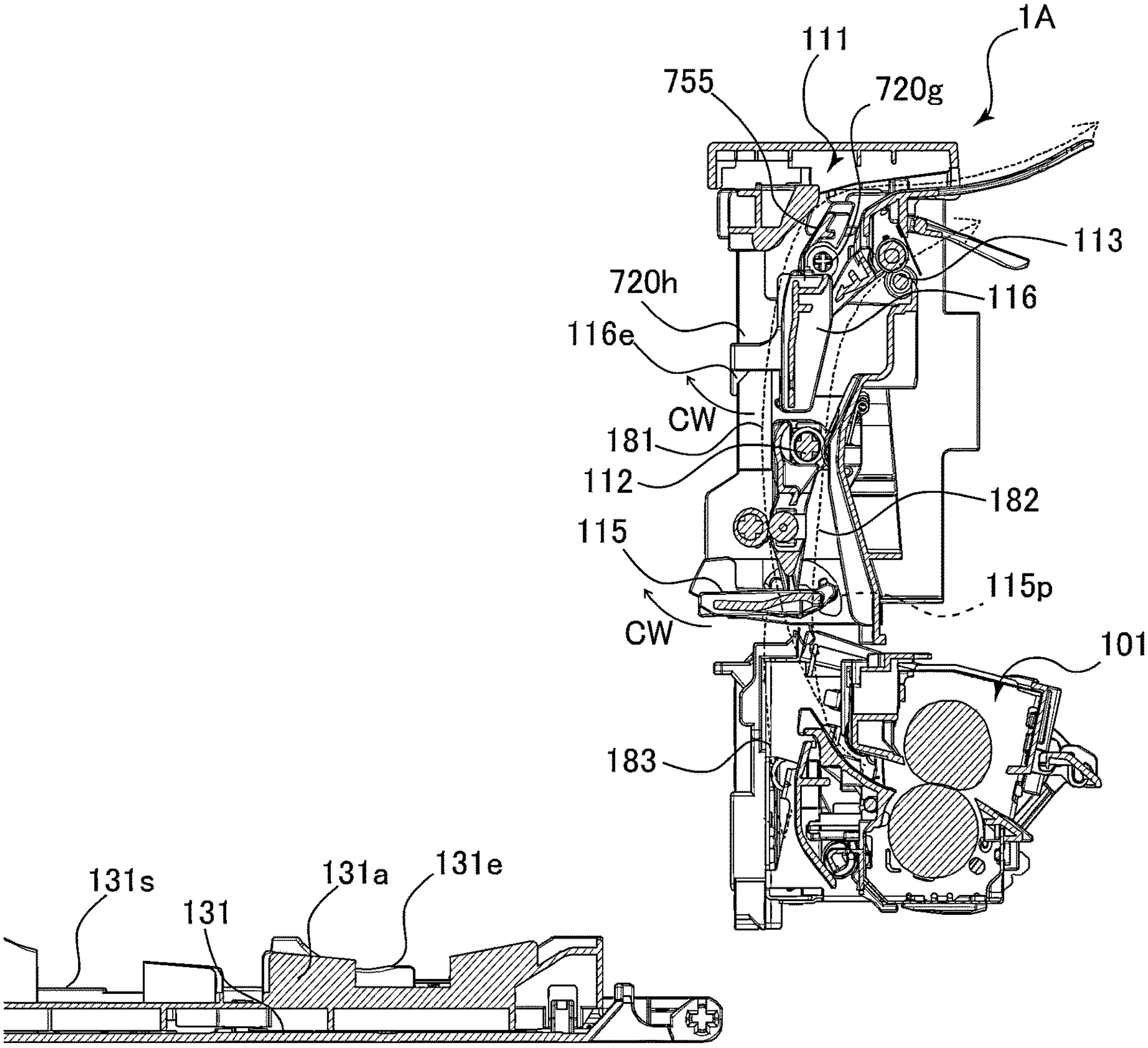
FIG. 11 is a cross-sectional view illustrating the discharge reversing unit in a state in which the rear door is opened and the intermediary conveying guide is positioned in the guiding position.
Figure 12:
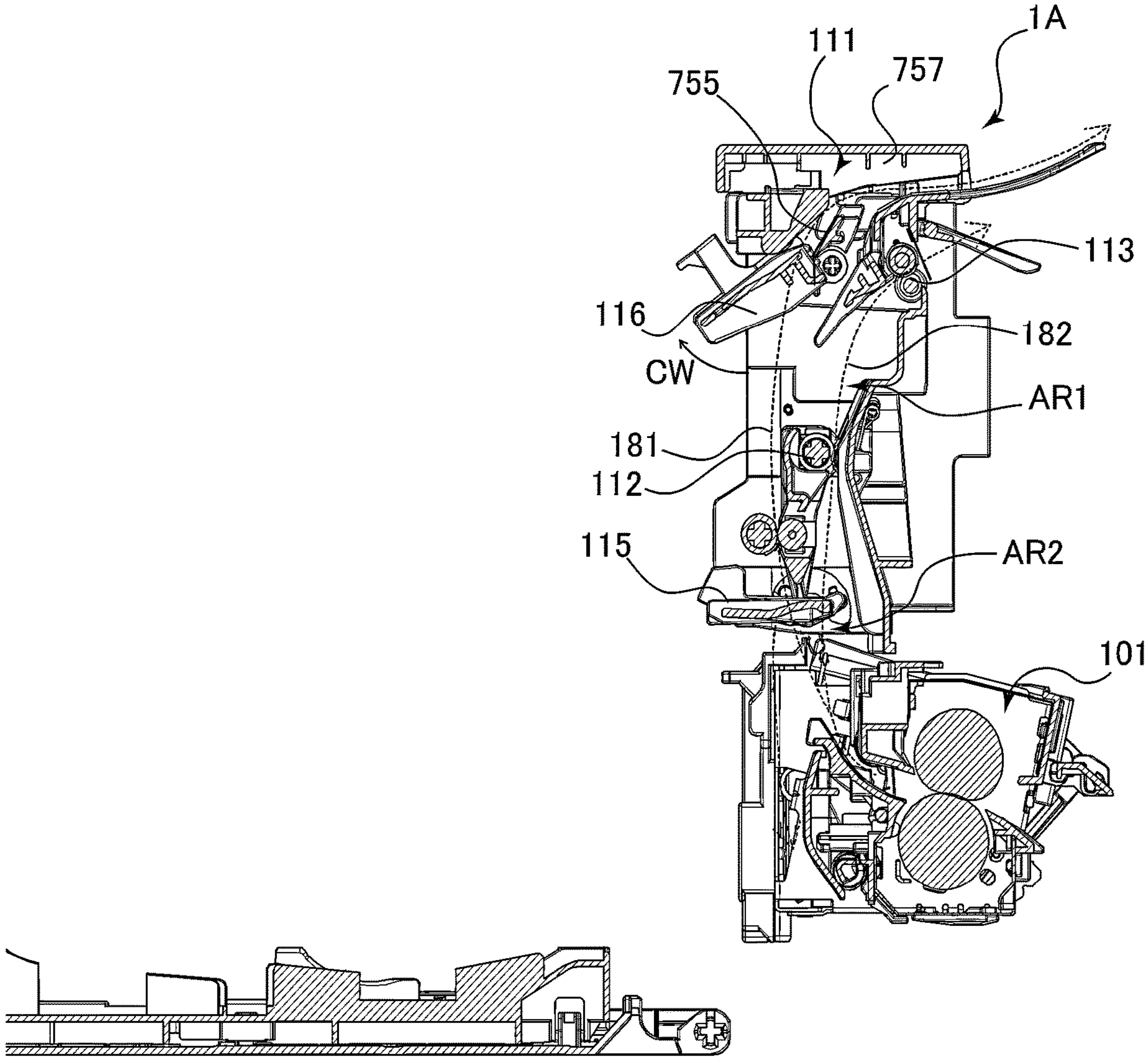
FIG. 12 is a cross-sectional view illustrating the discharge reversing unit in a state in which the rear door is opened and the intermediary conveying guide is positioned in a jam clearing position.

Next, operation to open the discharge conveyance passage 182 will be described using FIG. 10 through FIG. 12. FIG. 10 is a cross-sectional view illustrating the discharge reversing unit 111 in a state in which the rear door 131 is closed. FIG. 11 is a cross-sectional view illustrating the discharge reversing unit 111 in a state in which the rear door 131 is opened and the intermediary conveying guide 116 is positioned in the guiding position. FIG. 12 is a cross-sectional view illustrating the discharge reversing unit 111 in a state in which the rear door 131 is opened and the intermediary conveying guide 116 is positioned in a jam clearing position. Incidentally, in FIG. 10 through FIG. 12, a part of ribs of the rear door guide 131*a* and the reversing guide 755 are removed for the sake of description.

As shown in FIG. 10, the intermediary conveying guide 116 is positioned in the guiding position in the state in which the rear door 131 is positioned in the closed position as a first closed position, where it is closed to the main assembly of the image forming apparatus 1A. This is because the rotation stop portion 116*e* of the intermediary conveying guide 116 is sandwiched by the abutting portion 720*h* of the discharging frame 720 and the rotation restricting portion 131*s* of the rear door guide 131*a* as described above.

In addition, in the state in which the rear door 131 is positioned in the closed position, the guide member 115 is positioned in the discharging position. This is because the guide member 115 is urged toward the rear door guide 131*a* by the spring 711 and the rotation restricted portion 115*e* of the guide member 115 is abutting to the rotation restricting portion 131*e* of the rear door guide 131*a*.

When the user opens the discharge conveyance passage 182 for jam clearance, for example, as shown in FIG. 11, the user first moves the rear door 131 to the open position as a first open position, where it is opened to the main assembly of the image forming apparatus 1A. The guide member 115 is then rotated in the CW direction about the rotational center boss 115*p* by the urging force of the spring 711. As a result, the guide member 115 is moved from the discharging position as a third closed position to the jam clearing position as a third open position shown in FIG. 11. Incidentally, the guide member 115 is positioned in the jam clearing position by abutting to an unshown stopper provided in the discharging frame 720 in the jam clearing position, for example.

In addition, in a state in which the rear door 131 is positioned in the open position, since the rotation restricting portion 131*s* of the rear door guide 131*a* is separated from the rotation stop portion 116*e* of the intermediary conveying guide 116, the intermediary conveying guide 116 becomes rotatable in an arrow CW direction about the rotational center boss 720*g*. Incidentally, at this time, the intermediary conveying guide 116 still maintains a state abutting to the abutting portion 720*h* of the discharging frame 720 by rotational force due to its own weight, and is held in the guiding position.

Next, by the user manually operating the intermediary conveying guide 116, the intermediary conveying guide 116 is moved in the arrow CW direction, and can be positioned in the jam clearing position shown in FIG. 12. In a state in which the rear door 131 is in the open position and the intermediary conveying guide 116 and the guide member 115 are in the respective jam clearing positions, the discharge conveyance passage 182 is opened.

Specifically, the intermediary conveying guide 116 is positioned in the jam clearing position as a second open position, a portion AR1 of the discharge conveyance passage 182 is opened. The portion AR1 is an area between the intermediary conveying roller pair 112 and the discharging roller pair 113 in the discharge conveyance passage 182. Incidentally, the intermediary conveying guide 116 forms the portion AR1 of the discharge conveyance passage 182 in the guiding position (position shown in FIG. 11).

In addition, by the guide member 115 being positioned in the jam clearing position, a portion AR2 of the discharge conveyance passage 182, which is different from the part AR1, is opened. The part AR2 is an area between the fixing portion 101 and the intermediary conveying roller pair 112 in the discharge conveyance passage 182. Incidentally, the guide member 115 forms the part AR2 of the discharge conveyance passage 182 in the discharging position (position shown in FIG. 10).

In this manner, by opening the rear door 131 and moving the intermediary conveying guide 116 to the jam cleaning position, jam clearance for removing a jammed sheet in the discharge conveyance passage 182 can be performed. In particular, by the intermediary conveying guide 116 being positioned in the jam clearing position, the portion AR1 of the discharge conveyance passage 182 is opened, therefore a jam occurring between the intermediary conveying roller pair 112 and the discharging roller pair 113 can be cleared.

In addition, by the rear door 131 being opened in the open position, the reverse conveyance passage 181 is opened. Therefore, without moving the intermediary conveying guide 116 to the jam cleaning position, but simply by opening the rear door 131, the jam clearance in the reverse conveyance passage 181 can be performed.

Mounting/Demounting Operation of the Fixing Portion

Figure 13A:
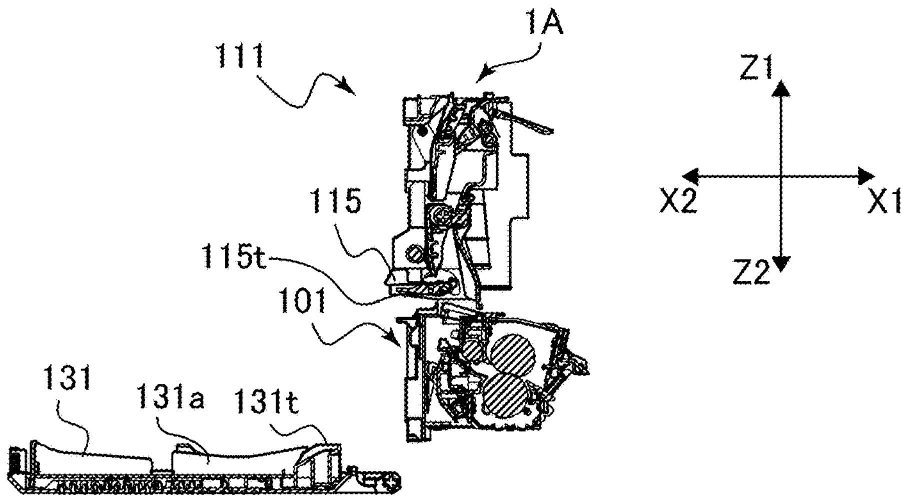
FIG. 13(*a*) is a cross-sectional view illustrating a state in which the rear door is positioned in an open position and a fixing portion is positioned in a mounted position, FIG. 13 (*b*) is a cross-sectional view illustrating a state in which the fixing portion is pulled out from a main assembly of the image forming apparatus, and FIG. 13(*c*) is a cross-sectional view illustrating a state in which the fixing portion is further pulled out from the main assembly of the image forming apparatus.
Figure 13B:
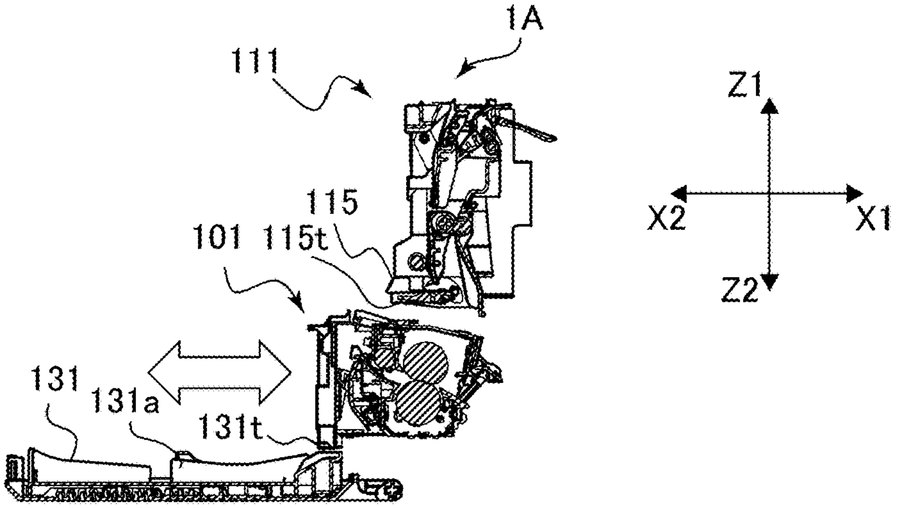
Figure 13C:
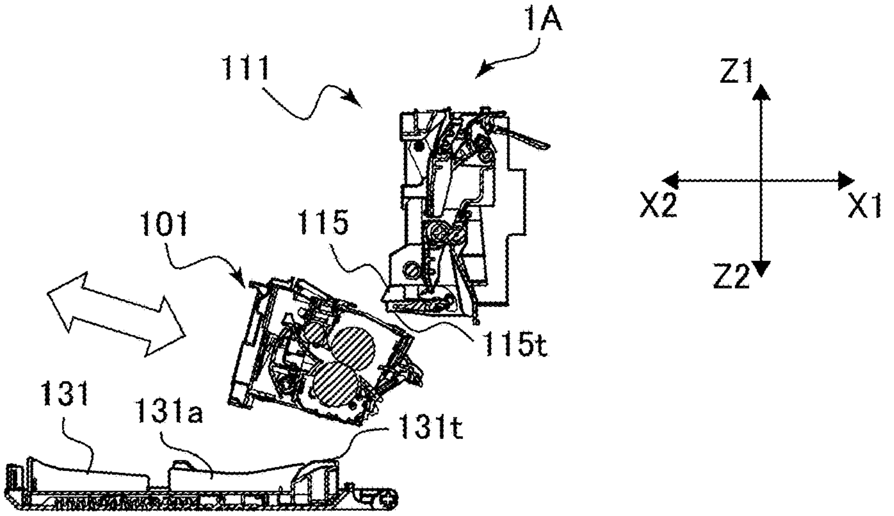

FIG. 13(*a*) is a cross-sectional view illustrating a state in which the rear door 131 is positioned in the open position and the fixing portion 101 is positioned in a mounting position. FIG. 13(*b*) is a cross-sectional view illustrating a state in which the fixing portion 101 is pulled out of the main assembly of the image forming apparatus 1A. FIG. 13(*c*) is a cross-sectional view illustrating a state in which the fixing portion 101 is pulled further out of the main assembly of the image forming apparatus 1A.

As shown in FIG. 13(*a*), when the fixing portion 101 is removed from the main assembly of the image forming apparatus 1A, the user first moves the rear door 131 to the open position. At this time, as described above, the guide member 115 is moved to the jam clearing position by the urging force of the spring 711. A lower end portion 115*t* of the guide member 115, which is positioned in the jam clearing position, is positioned above the fixing portion 101, which is positioned in the mounting position, in the vertical direction (Z direction). In addition, an upper end portion 131*t* of the rear door guide 131*a* of the rear door 131, which is in the open position, is positioned below the fixing portion 101, which is in the mounting position, in the vertical direction (Z direction).

Therefore, by opening the rear door 131 to the open position, the fixing portion 101 becomes movable in the X2 direction through the lower end portion 115*t* of the guide member 115 and the upper end portion 131*t* of the rear door guide 131*a*. The user can demount the fixing portion 101 with respect to the main assembly of the image forming apparatus 1A, as shown in FIG. 13(*b*), in the X2 direction which is along the horizontal direction. The user can then demount the fixing portion 101 from the main assembly of the image forming apparatus 1A by moving the fixing portion 101 further in a direction between the X2 direction and the Z1 direction, as shown in FIG. 13(*c*). Incidentally, the main assembly of the image forming apparatus 1A may have, for example, a guide rail guiding the fixing portion 101 from the mounting position shown in FIG. 13(*a*) to a position shown in FIG. 13(*b*). Upon mounting the fixing portion 101 to the main assembly of the image apparatus 1A, reverse operation to the operation for demounting the fixing portion 101 from the main assembly of the image apparatus 1A may be performed. Thus, the guide member 115 positioned in the jam clearing position is positioned above a mounted/demounted locus of the fixing portion 101 when the fixing portion 101 is mounted to and demounted from a unshown frame of the main assembly of the image forming apparatus 1A. Therefore, the fixing portion 101 is mountable to and demountable from the frame of the main assembly of the image forming apparatus 1A along the horizontal direction when the rear door 131 is positioned in the open position.

As described above, in the present Embodiment, the intermediary conveying guide 116 is configured to be movable to the jam clearing position by the user when the rear door 131 is positioned in the open position. And when the intermediary conveying guide 116 is moved to the jam clearing position, the portion AR1 of the discharge conveyance passage 182 is opened. Therefore, even in a configuration in which the intermediary conveying roller pair 112 is provided between the fixing portion 101 and the discharging roller pair 113, it becomes possible to clear the jam which occurs between the intermediary conveying roller pair 112 and the discharging roller pair 113. Thus, the jam clearing performance can be improved.

Embodiment 2

Next, an Embodiment 2 of the present invention will be described, and the Embodiment 2 is what the configuration for opening the intermediary conveying guide 116 in the Embodiment 1 is modified. Therefore, with respect to the same configurations as in the Embodiment 1, illustrations in Figures will be omitted, or the same reference numerals will be attached in Figures.

Intermediary Conveying Guide

Figure 14A:
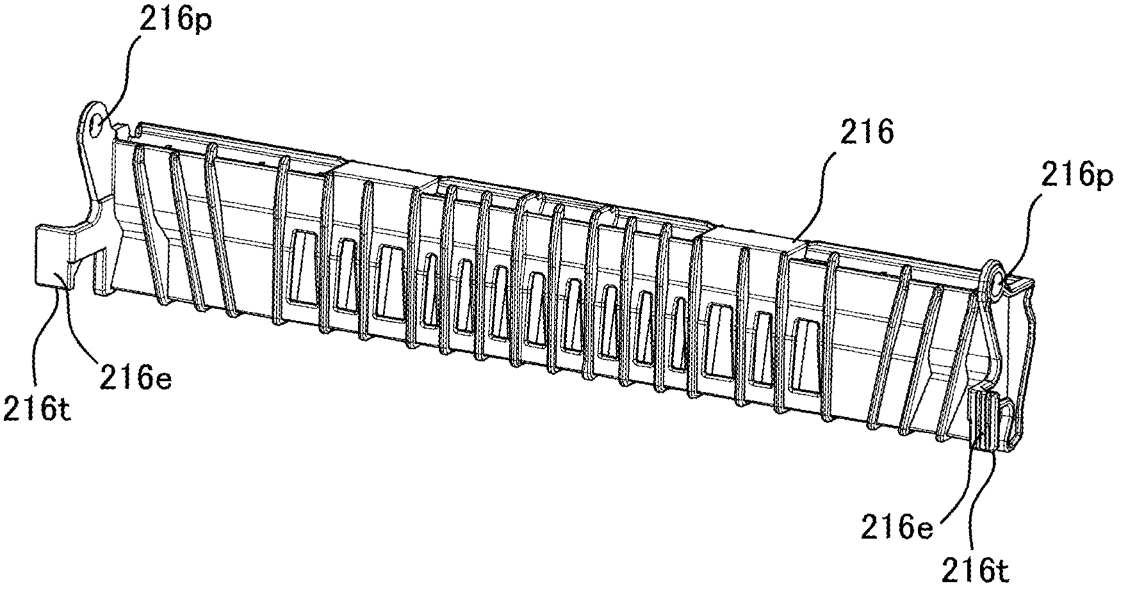
FIG. 14(*a*) is a perspective view illustrating an intermediary conveying guide according to an Embodiment 2, and FIG. 14(*b*) is a side view illustrating the intermediary conveying guide positioned in a guiding position.
Figure 14B:
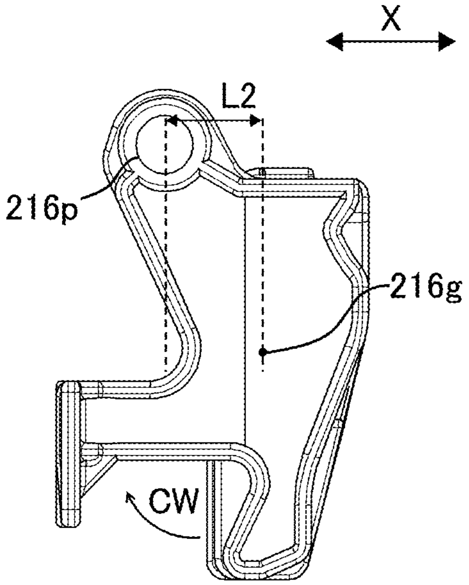
Figure 15:
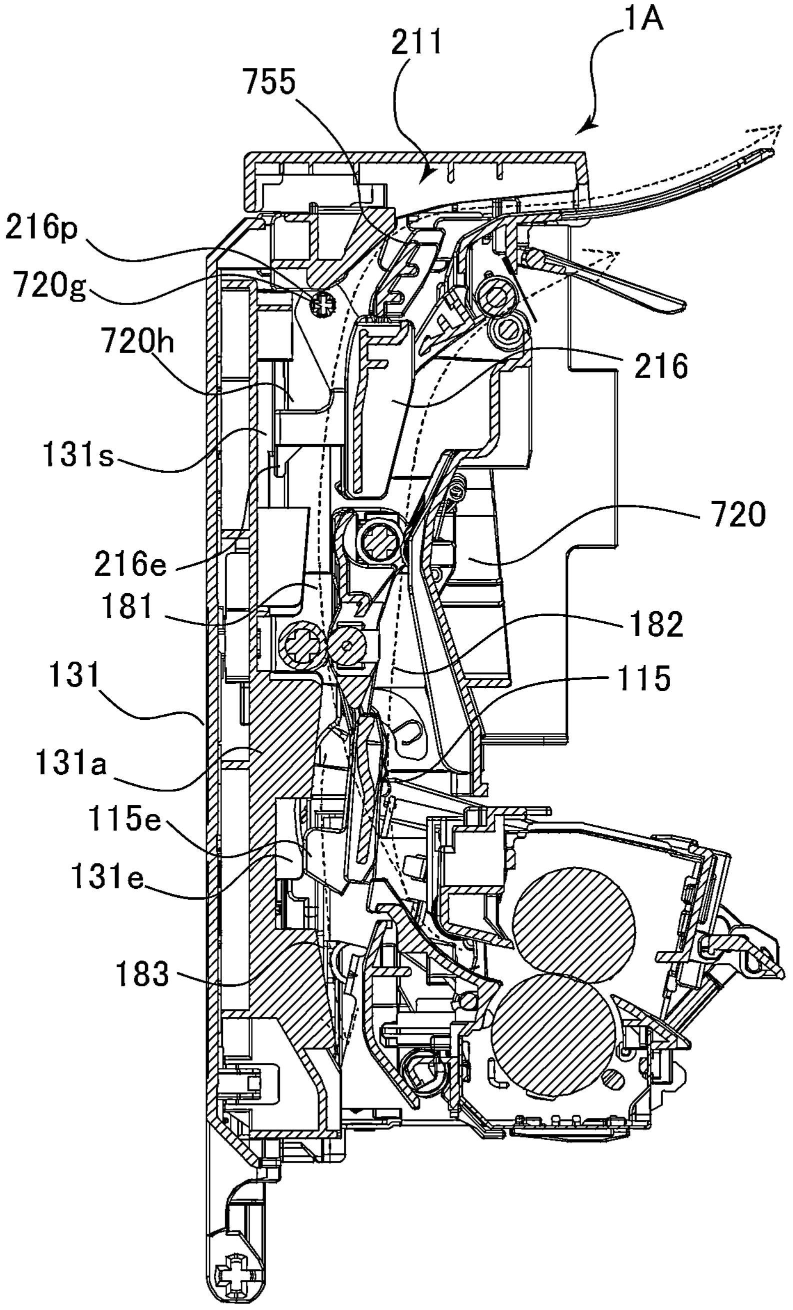
FIG. 15 is a cross-sectional view illustrating the discharge reversing unit in a state in which a rear door is closed.

First, a configuration of an intermediary conveying guide 216 will be described using FIG. 14(*a*) through FIG. 15. FIG. 14(*a*) is a perspective view illustrating the intermediary conveying guide 216 according to the Embodiment 2, and FIG. 14(*b*) is a side view illustrating the intermediary conveying guide 216 positioned in the guiding position. FIG. 15 is a cross-sectional view illustrating a discharge reversing unit 211 in a state in which the rear door 131 is closed.

As shown in part (a) of FIG. 14 and FIG. 15, the intermediary conveying guide 216 as the guide member and the first guide member is configured to be rotatable about a rotational center hole 216*p* with respect to the rotational center boss 720*g* of the discharging frame 720. In addition, the intermediary conveying guide 216 includes a rotation stop portion 216*e*, and is positioned in a guiding position (position shown in FIG. 15) by the rotation stop portion 216*e* being sandwiched by the discharging frame 720 and the rear door guide 131*a*. The intermediary conveying guide 216 guides the sheet S passing through the discharge conveyance passage 182 or the reverse conveyance passage 181 in the guiding position. Incidentally, the rotational center hole 216*p* and the rotation stop portion 216*e* are provided at both end portions of the intermediary conveying guide 216 in the Y direction.

In addition, the intermediary conveying guide 216 also includes a contacting portion 216*t* which is first in contact with the rotation restricting portion 131*s* of the rear door guide 131*a* when the rear door 131 is closed from the open position to the closed position.

As shown in FIG. 14(*b*), in a state in which the intermediary conveying guide 216 is positioned in the guiding position, the rotational center hole 216*p* and a center of gravity 216*g* of the intermediary conveying guide 216 are positioned in different positions in the X direction (front-back direction). More specifically, a center of the rotational center hole 216*p* and the center of gravity 216*g* are separated by a distance L2 in the X direction. In other words, the rotational center hole 216*p* is disposed closer to the rear door 131 than the center of gravity 216*g* of the intermediary conveying guide 216 in a state in which the rear door 131 is in the closed position.

The intermediary conveying guide 216 moves so that the rotational center hole 216*p* and the center of gravity 216*g* overlap in the X direction in a natural state, that is, in a state in which no external force is acting on the intermediary conveying guide 216. In other words, the intermediary conveying guide 216 rotates so that the distance L2 becomes 0. Therefore, in a state in which the intermediary conveying guide 216 is attached to the discharging frame 720 and held in the guiding position, on the intermediary conveying guide 216, due to its own weight, rotational force to rotate the intermediary conveying guide 216 in a CW direction about the rotational center hole 216*p* is acting.

[Operation to Open the Discharge Conveyance Passage]

Figure 16:
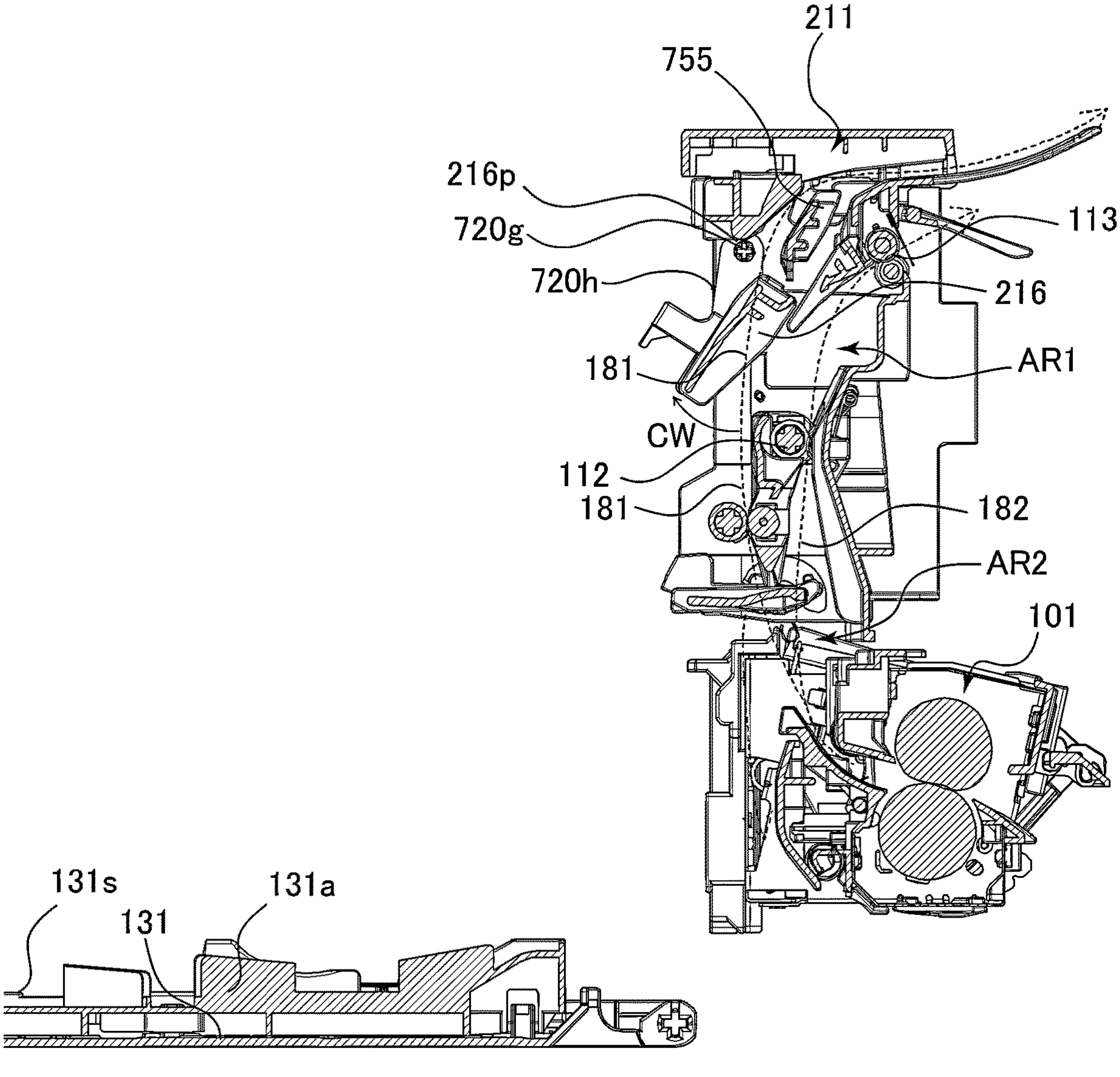
FIG. 16 is a cross-sectional view illustrating the discharge reversing unit in a state in which the rear door is opened and the intermediary conveying guide is positioned in a neutral position.
Figure 17:
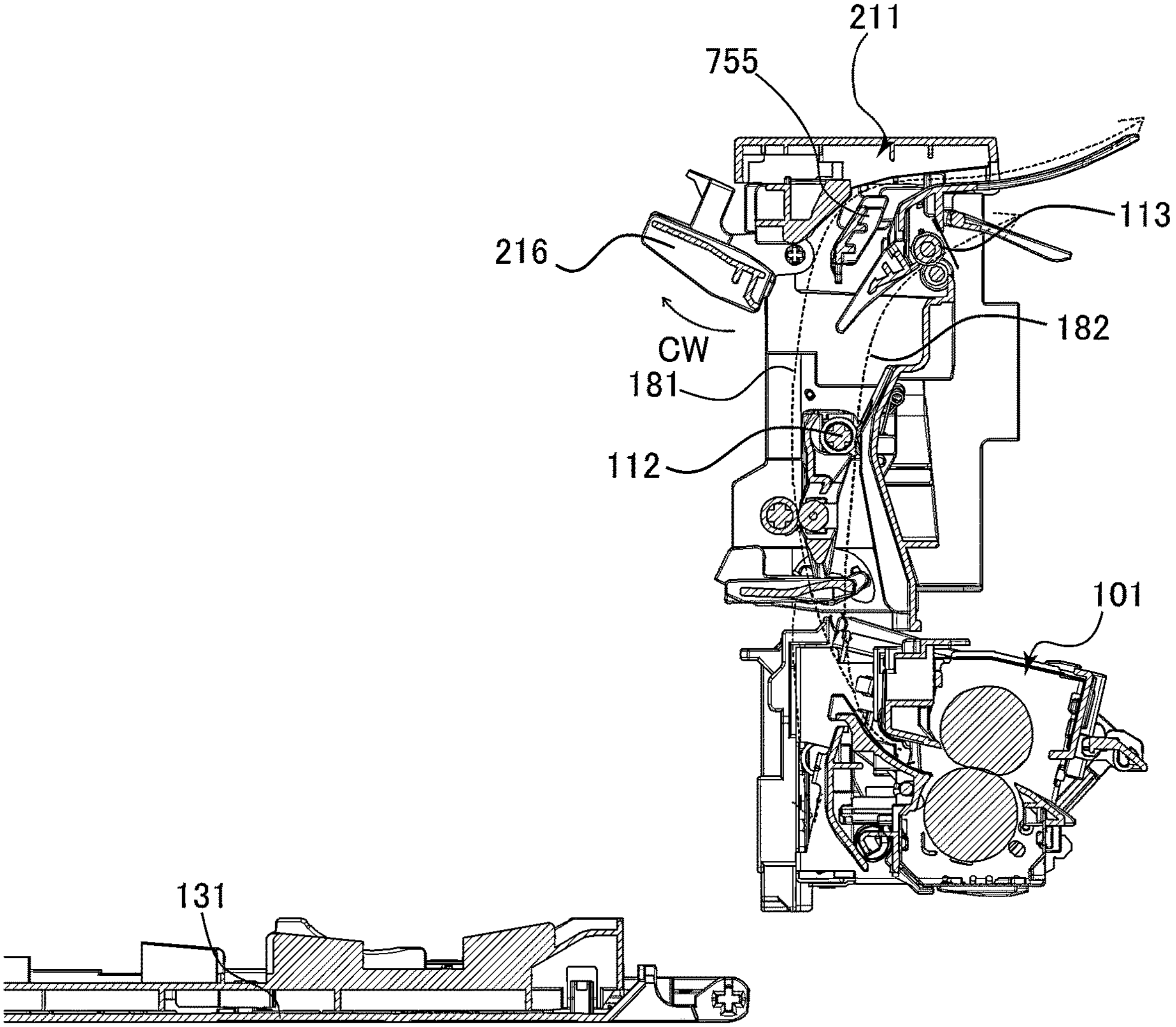
FIG. 17 is a cross-sectional view illustrating the discharge reversing unit in a state in which the rear door is opened and the intermediary conveying guide is positioned in a jam clearing position.
Figure 18:
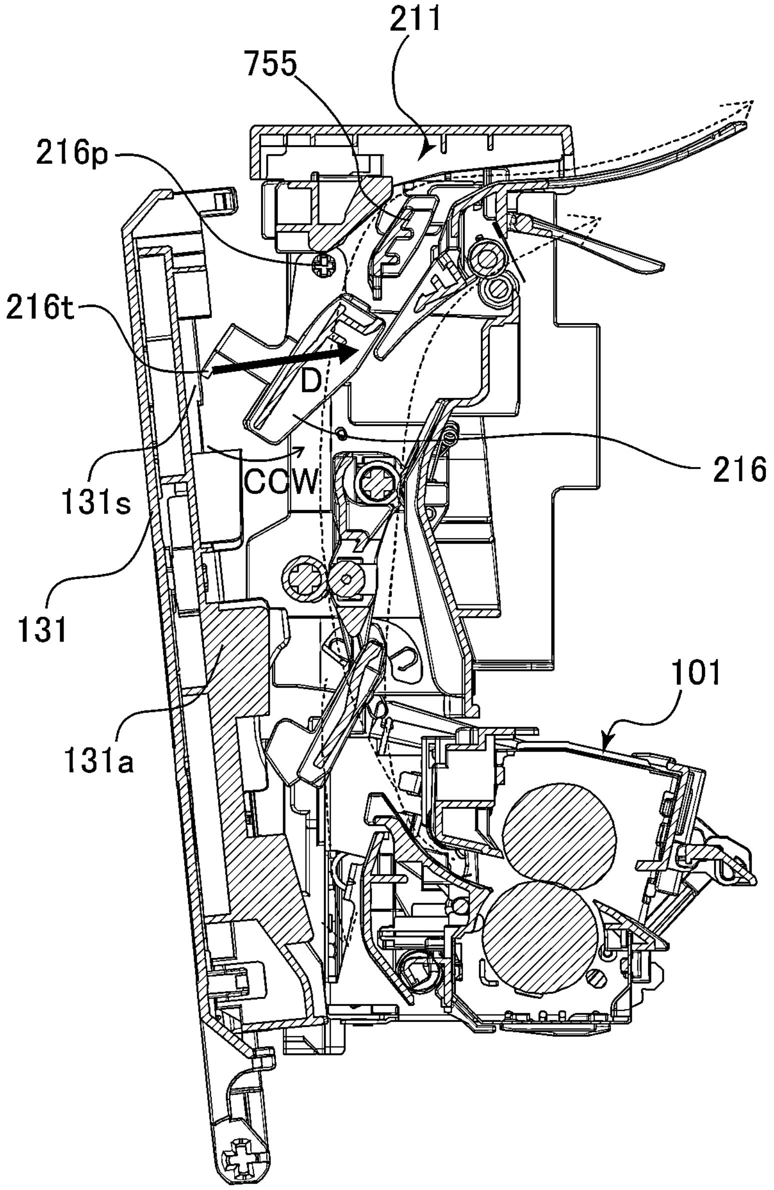
FIG. 18 is a cross-sectional view illustrating the discharge reversing unit in a state in which the rear door is in contact with the intermediary conveying guide when the rear door is closed.

Next, operation to open the discharge conveyance passage 182 will be described using FIG. 15 through FIG. 18. FIG. 16 is a cross-sectional view illustrating the discharge reversing unit 211 in a state in which the rear door 131 is opened and the intermediary conveying guide 216 is positioned in a neutral position. FIG. 17 is a cross-sectional view illustrating the discharge reversing unit 211 in a state in which the rear door 131 is opened and the intermediary conveying guide 216 is positioned in the jam clearing position. FIG. 18 is a cross-sectional view illustrating the discharge reversing unit 211 in a state in which the rear door 131 is in contact with the intermediary conveying guide 216 upon closing the rear door 131. Incidentally, in FIG. 15 through FIG. 18, a part of ribs of the rear door guide 131*a* and the reversing guide 755 are removed for the sake of description. In addition, since the operation of the guide member 115 is the same as in the Embodiment 1, description thereon will be omitted.

As shown in FIG. 15, in a state in which the rear door 131 is positioned in the closed position, where it is closed to the main assembly of the image forming apparatus 1A, the intermediary conveying guide 216 is positioned in the guiding position. This is because the rotation stop portion 216*e* of the intermediary conveying guide 216 is sandwiched by the abutting portion 720*h* of the discharging frame 720 and the rotation restricting portion 131*s* of the rear door guide 131*a* as described above.

When the user opens the discharge conveyance passage 182 for the jam clearance, for example, the user first moves the rear door 131 to the open position, where it is open to the main assembly of the image forming apparatus 1A, as shown in FIG. 16. At this time, since the rotation restricting portion 131*s* of the rear door guide 131*a* separates from the rotation stop portion 216*e* of the intermediary conveying guide 216, the intermediary conveying guide 216 becomes rotatable in an arrow CW direction about the rotational center boss 720*g*. In the present Embodiment, since the intermediary conveying guide 216 is urged in the arrow CW direction by its own weight in the natural state, the intermediary conveying guide 216 rotates in the arrow CW direction to the neutral position shown in FIG. 16 in parallel with the opening operation of the rear door 131. In other words, the intermediary conveying guide 216 is urged toward the neutral position as the second open position shown in FIG. 16 by its own weight.

By this, the portion AR1 of the discharge conveyance passage 182 is opened. The portion AR1 is the area between the intermediary conveying roller pair 112 and the discharging roller pair 113 in the discharge conveyance passage 182. Therefore, even in the configuration in which the intermediary conveying roller pair 112 is provided between the fixing portion 101 and the discharging roller pair 113, it becomes possible to clear the jam which occurs between the intermediary conveying roller pair 112 and the discharging roller pair 113.

Incidentally, the intermediary conveying guide 216 opens the portion AR1 of the discharge conveyance passage 182 in the neutral position, however, the user may open the intermediary conveying guide 216 to the jam clearing position shown in FIG. 17 by manually operating the intermediary conveying guide 216. By this, it becomes possible to perform the jam clearance in the portion AR1 of the discharge conveyance passage 182 more easily.

In addition, as shown in FIG. 18, when the user closes the rear door 131 from the open position toward the closed position, the rotation restricting portion 131*s* of the rear door 131 is in contact with the contacting portion 216*t* of the intermediary conveying guide 216, which is positioned in the neutral position. At this time, the intermediary conveying guide 216 receives force in a direction of an arrow D. Since the force in the direction of the arrow D is force acting below the rotational center hole 216*p* of the intermediary conveying guide 216 in the vertical direction, the intermediary conveying guide 216 receives rotational force in a CCW direction from the rear door 131.

Therefore, when the rear door 131 is closed further from a state shown in FIG. 18, the intermediary conveying guide 216 is closed in the CCW direction from the neutral position in interrelation with the closing operation of the rear door 131. And when the rear door 131 is closed to the closed position (position shown in FIG. 15), the intermediary conveying guide 216 is sandwiched again by the abutting portion 720*h* of the discharging frame 720 and the rotation restricting portion 131*s* of the rear door guide 131*a*. By this, the intermediary conveying guide 216 is positioned in the guiding position.

As described above, in the present Embodiment, the position of the rotational center hole 216*p* and the center of gravity 216*g* of the intermediary conveying guide 216 are configured so that when the rear door 131 is opened, the intermediary conveying guide 216 is rotated from the guiding position to the neutral position by its own weight. By this, by the user opening the rear door 131, the intermediary conveying guide 216 is automatically moved to the neutral position, and the portion AR1 of the discharge conveyance passage 182 is opened. Therefore, it becomes possible to omit operation in which the user manually rotates the intermediary conveying guide 216 from the guiding position, and to improve the jam clearing performance. In addition, since the intermediary conveying guide 216 is rotated to the neutral position simply by opening the rear door 131, the sheet jammed in the portion AR1 of the discharge conveyance passage 182 can be easily seen.

Embodiment 3

Next, an Embodiment 3 of the present invention will be described, and the Embodiment 3 is what the configuration for opening the intermediary conveying guide 116 of the Embodiment 1 is modified. Therefore, with respect to the same configurations as in the Embodiment 1, illustrations in Figures will be omitted, or the same reference numerals will be attached in Figures.

Intermediary Conveying Guide

Figure 19A:
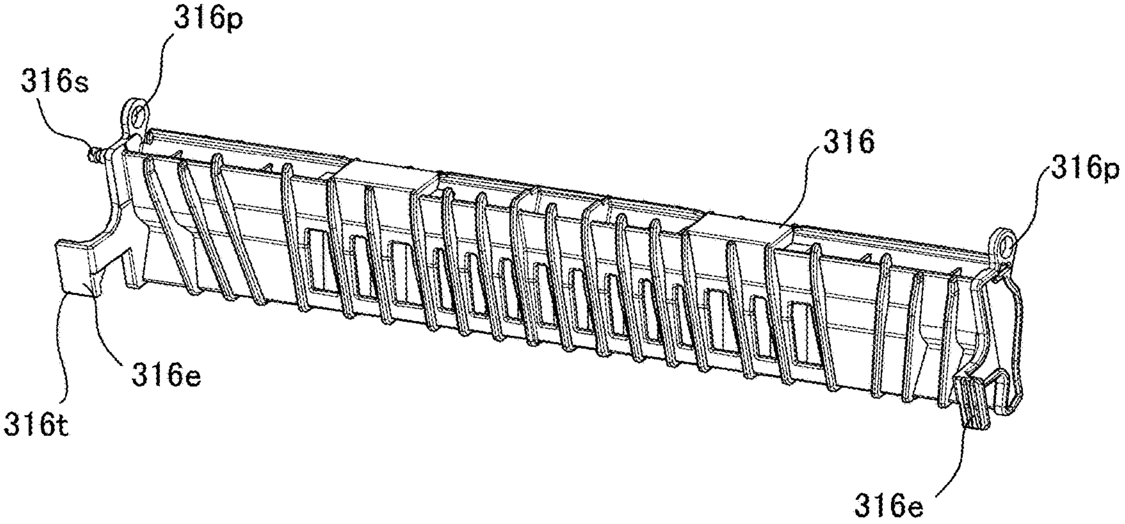
FIG. 19(*a*) is a perspective view illustrating an intermediary conveying guide according to an Embodiment 3, and FIG. 19(*b*) is a side view illustrating the intermediary conveying guide positioned in a guiding position.
Figure 19B:
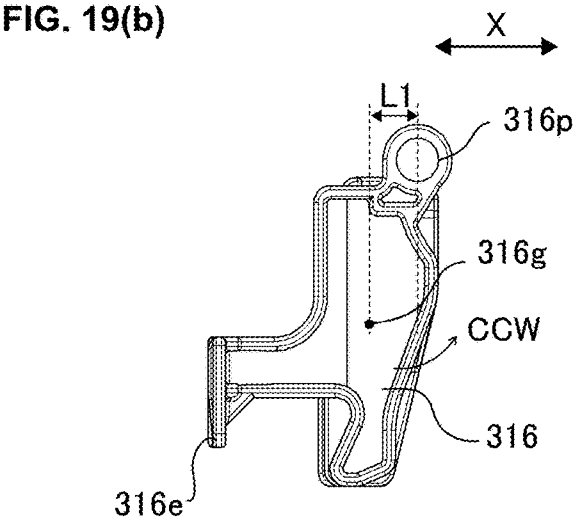
Figure 20A:
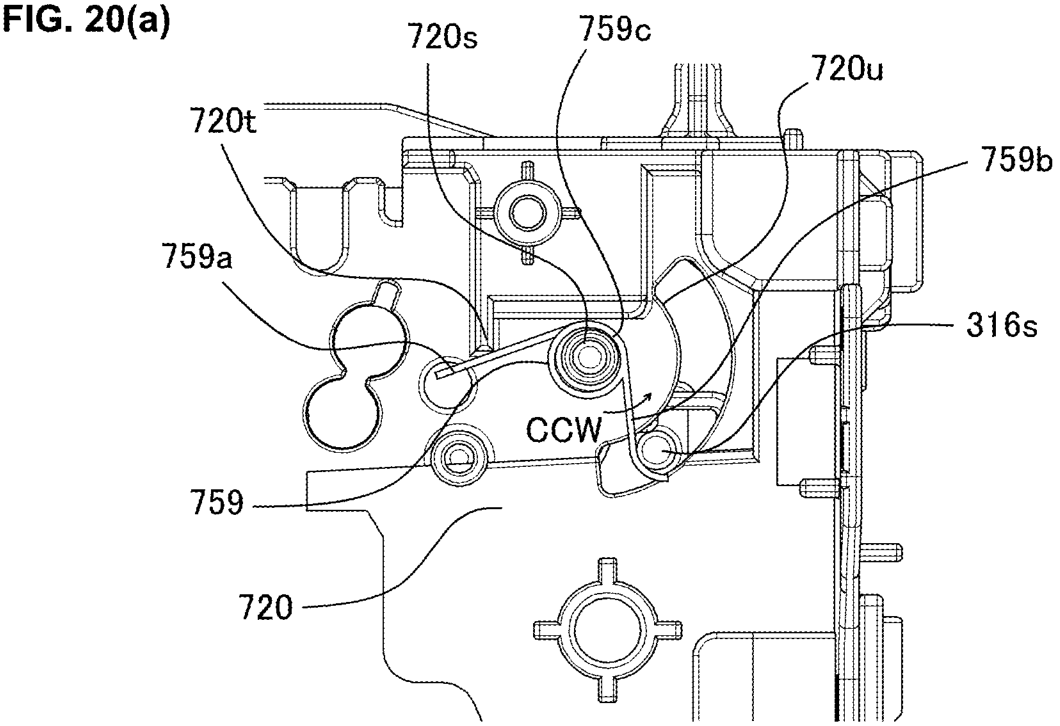
FIG. 20(*a*) is a side view illustrating a discharging frame and a guide spring, and FIG. 20(*b*) is a front view illustrating the discharging frame and the intermediary conveying guide.
Figure 20B:
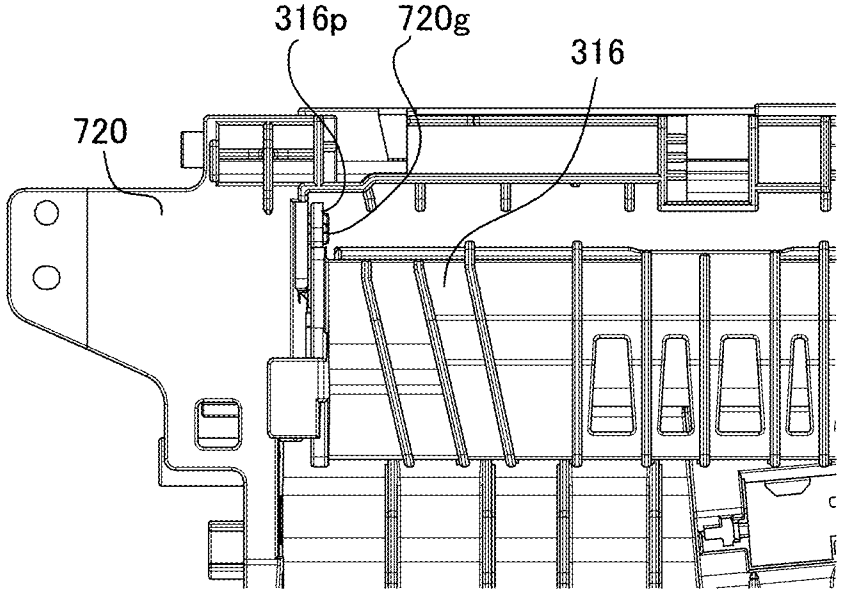
Figure 21:
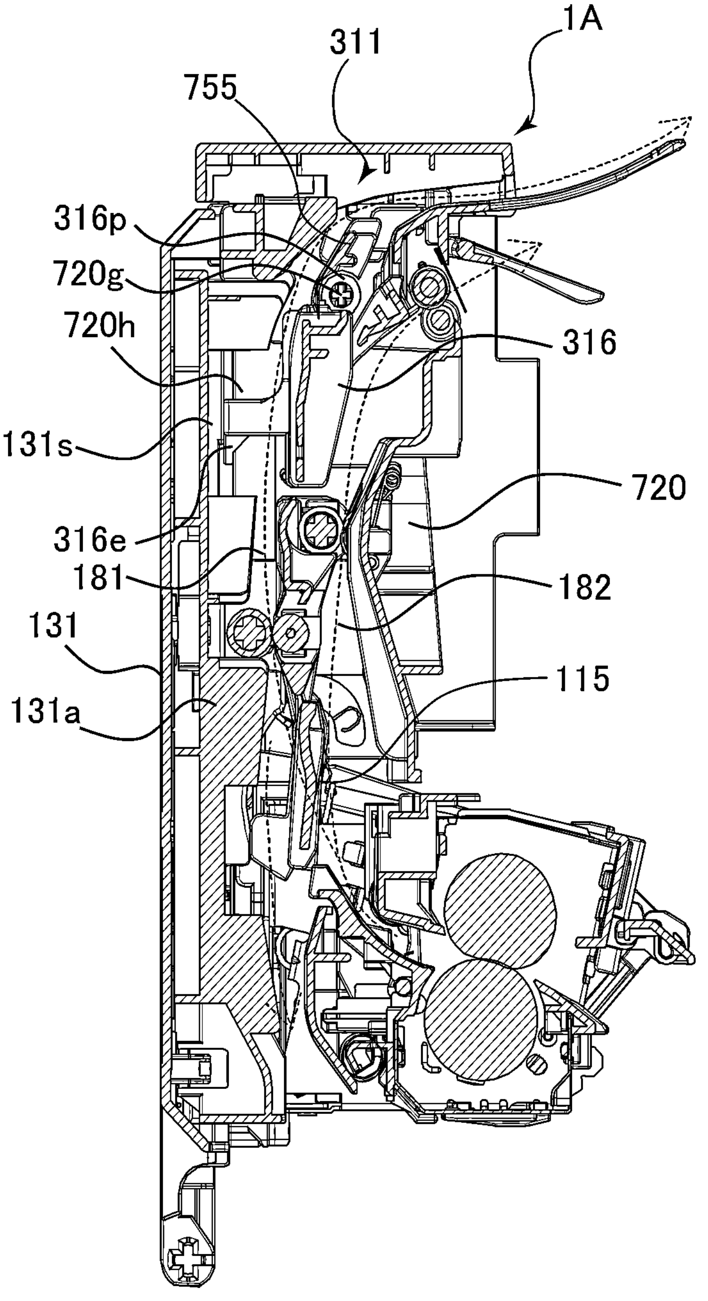
FIG. 21 is a cross-sectional view illustrating the discharge reversing unit in a state in which a rear door is closed.

First, a configuration of an intermediary conveying guide 316 will be described using FIG. 19(*a*) through FIG. 21. FIG. 19(*a*) is a perspective view illustrating the intermediary conveying guide 316 according to the Embodiment 3, and FIG. 19(*b*) is a side view illustrating the intermediary conveying guide 316 positioned in the guiding position. FIG. 20(*a*) is a side view illustrating the discharging frame 720 and a guide spring 759, and FIG. 20(*b*) is a front view illustrating the discharging frame 720 and the intermediary conveying guide 316. FIG. 21 is a cross-sectional view illustrating a discharge reversing unit 311 in a state in which the rear door 131 is closed.

As shown in FIG. 19(*a*), FIG. 20(*b*) and FIG. 21, the intermediary conveying guide 316 as the guide member and the first guide member is rotatable about a rotational center hole 316*p* with respect to the rotational center boss 720*g* of the discharging frame 720. In addition, the intermediary conveying guide 316 includes a rotation stop portion 316*e*, and is positioned in a guiding position (position shown in FIG. 21) by the rotation stop portion 316*e* being sandwiched by the discharging frame 720 and the rear door guide 131*a*. The intermediary conveying guide 316 guides the sheet S passing through the discharge conveyance passage 182 or the reverse conveyance passage 181 in the guiding position. Incidentally, the rotational center hole 316*p* and the rotation stop portion 316*e* are provided at both end portions of the intermediary conveying guide 316 in the Y direction.

In addition, the intermediary conveying guide 316 includes a contacting portion 316*t*, which is first in contact with the rotation restricting portion 131*s* of the rear door guide 131*a* when the rear door 131 is closed from the open position to the closed position, and a pressed portion 316*s* described later.

The intermediary conveying guide 316 in the present Embodiment has the same configuration as the intermediary conveying guide 116 in the Embodiment 1, except that the intermediary conveying guide 316 includes the pressed portion 316*s*. Therefore, as shown in FIG. 19(*b*), in a state in which the intermediary conveying guide 316 is positioned in the guiding position, the rotational center hole 316*p* and a center of gravity 316*g* of the intermediary conveying guide 316 are positioned in different positions in the X direction (front-back direction). More specifically, a center of the rotational center hole 316*p* and the center of gravity 316*g* are separated by the distance L1 in the X direction. In other words, the rotational center hole 316*p* is disposed farther from the rear door 131 than the center of gravity 316*g* of the intermediary conveying guide 316 in a state in which the rear door 131 is positioned in the closed position.

The intermediary conveying guide 316 moves so that the rotational center hole 316*p* and the center of gravity 316*g* overlap in the X direction in a natural state, that is, in a state in which no external force is acting on the intermediary conveying guide 316. In other words, the intermediary conveying guide 316 rotates so that the distance L1 becomes 0. Therefore, in a state in which the intermediary conveying guide 316 is attached to the discharging frame 720 and held in the guiding position, on the intermediary conveying guide 316, due to its own weight, rotational force to rotate the intermediary conveying guide 316 in a CCW direction about the rotational center hole 316*p* is acting.

As shown in FIG. 20(*a*), to the discharging frame 720, a boss portion 720*s* is provided, and to the boss portion 720*s*, a coil portion 759*c* of the guide spring 759 is attached. A fixing arm 759*a* of the guide spring 759 extending in one direction from the coil portion 759*c* is fixed to a fixing portion 720*t* of the discharging frame 720. In addition, an acting arm 759*b* of the guide spring 759 extending from the coil portion 759*c* to the other direction engages with the pressed portion 316*s* of the intermediary conveying guide 316. The pressed portion 316*s* penetrates an opening portion 720*u* of the discharging frame 720, which is formed in an arc-shaped about the boss portion 720*s*.

The intermediary conveying guide 316 is urged in a CCW direction about the rotational center hole 316*p* by the pressed portion 316*s* being pressed by the acting arm 759*b* of the guide spring 759. In other words, the intermediary conveying guide 316 is urged in a direction to open the discharge conveyance passage 182 by receiving rotational force rotating in the CCW direction from the guide spring 759.

[Operation to Open the Discharge Conveyance Passage]

Figure 22:
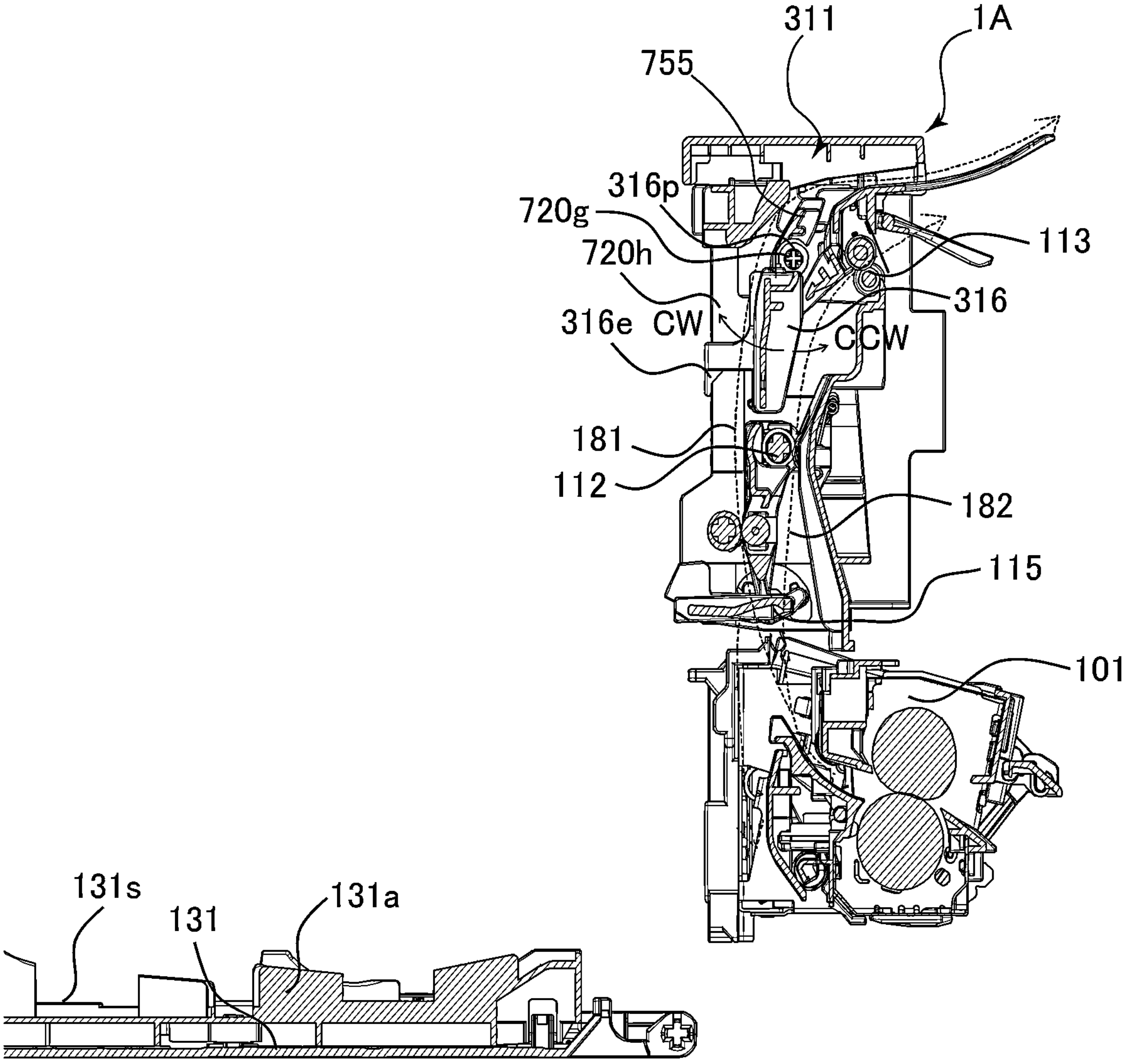
FIG. 22 is a cross-sectional view for describing force acting on the intermediary conveying guide when the rear door is opened.

Next, operation to open the discharge conveyance passage 182 will be described using FIG. 21 through FIG. 23. FIG. 22 is a cross-sectional view for describing force acting on the intermediary conveying guide 316 when the rear door 131 is opened.

Figure 23:
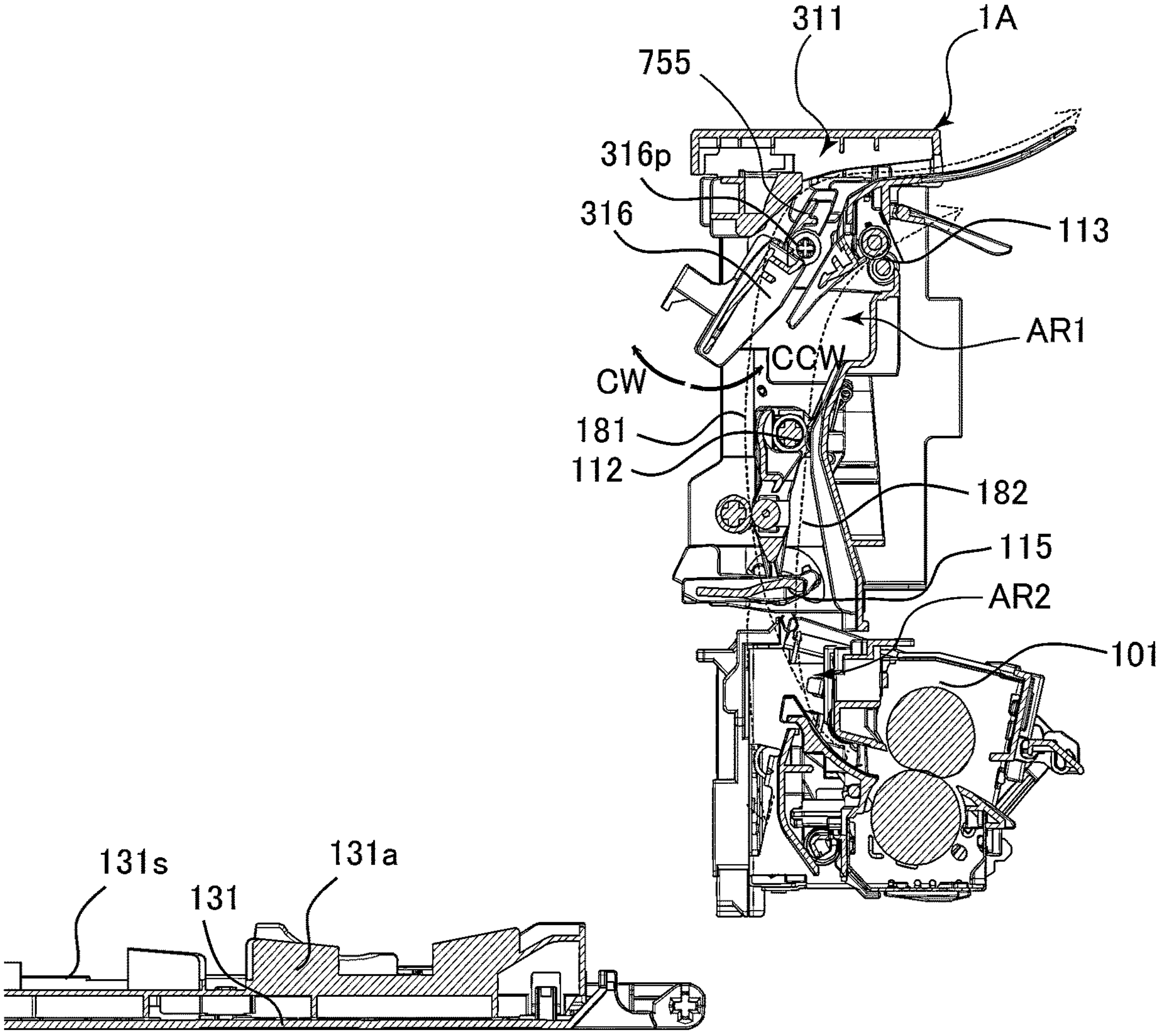
FIG. 23 is a cross-sectional view illustrating the discharge reversing unit in a state in which the rear door is opened and the intermediary conveying guide is positioned in a neutral position.

FIG. 23 is a cross-sectional view illustrating the discharge reversing unit 311 in a state in which the rear door 131 is opened and the intermediary conveying guide 316 is positioned in a neutral position. Incidentally, in FIG. 21 through FIG. 23, a part of ribs of the rear door guide 131*a* and the reversing guide 755 are removed for the sake of description. In addition, since the operation of the guide member 115 is the same as in the Embodiment 1, description will be omitted.

As shown in FIG. 21, in a state in which the rear door 131 is positioned in the closed position, where it is closed to the main assembly of the image forming apparatus 1A, the intermediary conveying guide 316 is positioned in the guiding position. This is because the rotation stop portion 316*e* of the intermediary conveying guide 316 is sandwiched by the abutting portion 720*h* of the discharging frame 720 and the rotation restricting portion 131*s* of the rear door guide 131*a* as described above.

When the user opens the discharge conveyance passage 182 for the jam clearance, for example, the user first moves the rear door 131 to the open position, where it is open to the main assembly of the image forming apparatus 1A, as shown in FIG. 22. At this time, since the rotation restricting portion 131*s* of the rear door guide 131*a* separates from the rotation stop portion 316*e* of the intermediary conveying guide 316, the intermediary conveying guide 316 becomes rotatable in an arrow CW direction about the rotational center boss 720*g*.

In the present Embodiment, the intermediary conveying guide 316 receives rotational force to rotate in the arrow CCW direction due to its own weight, and rotational force to rotate in the arrow CW direction from the guide spring 759 as an urging member. In a state in which the intermediary conveying guide 316 is positioned in the guiding position, the rotational force to rotate in the arrow CW direction by the guide spring 759 is set to be greater than the rotational force to rotate in the arrow CCW direction due to own weight of the intermediary conveying guide 316.

As a result, the intermediary conveying guide 316 rotates in the arrow CW direction to the neutral position shown in FIG. 23. When the intermediary conveying guide 316 reaches the neutral position, the rotational force in the arrow CW direction by the guide spring 759 and the rotational force in the arrow CCW direction due to own weight of the intermediary conveying guide 316 are balanced, and the intermediary conveying guide 316 is maintained in the neutral position. Incidentally, in FIG. 22, a state in which the rear door 131 is positioned in the open position and the intermediary conveying guide 316 is positioned in the guiding position is illustrated for the sake of description, however, in reality, the intermediary conveying guide 316 rotates toward the neutral position in interrelation with the opening operation of the rear door 131.

Thus, the intermediary conveying guide 316 is rotated in the arrow CW direction to the neutral position shown in FIG. 23 in parallel with the opening operation of the rear door 131. In other words, the intermediary conveying guide 316 is urged toward the neutral position as the second open position shown in FIG. 23 by the urging force of the guide spring 759.

By this, the portion AR1 of the discharge conveyance passage 182 is opened. The portion AR1 is the area between the intermediary conveying roller pair 112 and the discharging roller pair 113 in the discharge conveyance passage 182. Therefore, even in the configuration in which the intermediary conveying roller pair 112 is provided between the fixing portion 101 and the discharging roller pair 113, it becomes possible to clear the jam which occurs between the intermediary conveying roller pair 112 and the discharging roller pair 113.

Incidentally, the intermediary conveying guide 316 opens the portion AR1 of the discharge conveyance passage 182 in the neutral position, however, the user may open the intermediary conveying guide 316 to the jam clearing position shown in FIG. 17 by manually operating the intermediary conveying guide 316. By this, it becomes possible to perform the jam clearance in the portion AR1 of the discharge conveyance passage 182 more easily.

In addition, when the user closes the rear door 131 from the open position toward the closed position, the rotation restricting portion 131*s* of the rear door 131 becomes in contact with the contacting portion 316*t* of the intermediary conveying guide 316, which is positioned in the neutral position. And when the rear door 131 is closed further, the intermediary conveying guide 316 is closed in the CCW direction from the neutral position in interrelation with the closing operation of the rear door 131. And when the rear door 131 is closed to the closed position (position shown in FIG. 21), the intermediary conveying guide 316 is sandwiched again by the abutting portion 720$h$ of the discharging frame 720 and the rotation restricting portion 131$s$ of the rear door guide 131$a$. By this, the intermediary conveying guide 316 is positioned in the guiding position.

As described above, in the present Embodiment, the intermediary conveying guide 316 is configured to be rotated from the guiding position to the neutral position by the urging force of the guide spring 759 by the rear door 131 being opened. By this, by the user opening the rear door 131, the intermediary conveying guide 316 is automatically moved to the neutral position, and the portion AR1 of the discharge conveyance passage 182 is opened. Therefore, it becomes possible to omit the operation in which the user manually rotates the intermediary conveying guide 316 from the guiding position, and to improve the jam clearing performance. In addition, since the intermediary conveying guide 316 is rotated to the neutral position simply by opening the rear door 131, the sheet jammed in the portion AR1 of the discharge conveyance passage 182 can be easily seen.

In addition, in the present Embodiment, since the intermediary conveying guide 316 is configured to be rotated to the neutral position by the urging force of the guide spring 759, degree of freedom in a shape of the intermediary conveying guide 316 can be improved. For example, there is a case in which it is not possible to maintain relationship between the rotational center hole of the intermediary conveying guide and the center of gravity as in the Embodiment 2 due to limitation in space in the main assembly of the image forming apparatus 1A or in downsizing of the main assembly of the image forming apparatus 1A, etc. Even in such a case, by providing the guide spring 759, as in the present Embodiment, it becomes possible to rotate the intermediary conveying guide 316 to the neutral position in interrelation with the opening operation of the rear door 131.

Other Embodiments

Incidentally, in all of the described Embodiments, the intermediary conveying guides 116, 216 and 316 are configured to be rotatable with respect to the discharging frame 720, however, it is not limited thereto. For example, the intermediary conveying guides 116, 216 and 316 may be configured to be movable in sliding or removable with respect to the discharging frame 720, and to be capable of opening the discharge conveyance passage 182. In other words, the intermediary conveying guides 116, 216 and 316 may be configured in any manner, as long as the intermediary conveying guides 116, 216 and 316 are configured to be capable of opening the portion AR1 of the discharge conveyance passage 182 between the intermediary conveying roller pair 112 and the discharging roller pair 113 when the rear door 131 is positioned in the open position.

In addition, in all of the described Embodiments, in the intermediary conveying guides 116, 216 and 316, the rotational center holes 116$p$, 216$p$ and 316$p$ are disposed above the center of gravity 116$g$, 216$g$ and 316$g$ in the vertical direction, however, it is not limited thereto. For example, the rotational center holes 116$p$, 216$p$ and 316$p$ may be disposed below the center of gravity 116$g$, 216$g$ and 316$g$ in the vertical direction. In addition, in all of the described Embodiments, when the rear door 131 is positioned in the closed position, the intermediary conveying guides 116, 216 and 316 is positioned in the guiding position by the rotation stop portions 116$e$, 216$e$ and 316$e$ being sandwiched by the abutting portion 720$h$ and the rear door guide 131$a$, however, it is not limited thereto. In other words, the intermediary conveying guides 116, 216 and 316 may be positioned in the guiding position by at least one of the discharging frame 720 and the rear door 131. For example, since the intermediary conveying guide 116 in the Embodiment 1 is urged toward the discharging frame 720 by its own weight, the rear door 131 does not have to be in contact with the intermediary conveying guide 116, which is positioned in the guiding position.

In addition, in all of the described Embodiments, the guide member 115 is configured to be moved to the jam clearing position by the urging force of the spring 711 when the rear door 131 is opened, however, it is not limited thereto. For example, the guide member 115 may be configured to be moved to the jam clearing position by its own weight, rather than by the urging force of the spring 711. In addition, the guide member 115 may be configured to maintain the discharging position even when the rear door 131 is opened, and be movable manually by the user to the jam clearing position. While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-075872 filed on May 1, 2023, which is hereby incorporated by reference herein in its entirety.

What is claimed is:

1. An image forming apparatus comprising:

a main assembly of the image forming apparatus including a transfer roller configured to transfer a toner image onto a sheet;

a fixing portion including heating roller which incorporates a heater, the fixing portion fixing the toner image transferred by the transfer roller on the sheet;

a discharging roller configured to discharge the sheet on which the toner image is fixed by the fixing portion to an outside of the image forming apparatus;

an intermediary conveying portion provided in a conveyance passage through which the sheet is conveyed between the fixing portion and the discharging roller and configured to convey the sheet conveyed from the fixing portion toward the discharging roller; and a guide member disposed between the intermediary conveying portion and the discharging roller and movable between a second closed position where the guide member forms a portion of the conveyance passage and a second open position where the guide member opens the portion of the conveyance passage; and an open/close member movable between a first closed position where the open/close member is closed to the main assembly of the image forming apparatus and a first open position where the open/close member is opened to the main assembly of the image forming apparatus, wherein the guide member is constituted to be movable to the second open position while the open/close member is positioned in the first open position, and wherein a rotational center of the guide member is disposed above a center of gravity of the guide member in a vertical direction in a state in which the open/close member is positioned in the first closed position.

2. The image forming apparatus according to claim 1, wherein the main assembly of the image forming apparatus includes a discharging frame supporting the intermediary conveying portion, the discharging roller and the guide member.

3. The image forming apparatus according to claim 2, wherein the guide member is rotatably supported by the discharging frame about the rotational center and is positioned in the second closed position by at least one of the discharging frame and the open/close member.

4. The image forming apparatus according to claim 2, wherein the guide member is a first guide member, wherein the main assembly of the image forming apparatus includes a second guide member disposed between the fixing portion and the intermediary conveying portion and movable between a third closed position where the second guide member forms a part of the conveyance passage different from the portion of the conveyance passage and a third open position where the second guide member opens the part of the conveyance passage; and wherein the second guide member is constituted to be movable to the third open position while the open/close member is positioned in the first open position.

5. The image forming apparatus according to claim 4, wherein the second guide member is supported by the discharging frame.

6. The image forming apparatus according to claim 5, further comprising a second guide urging member configured to urge the second guide member, wherein the second guide member is supported by the discharging frame about a rotational center of the second guide member and is constituted to be positioned in the third closed position by being abutted to the open/close member by an urging force of the second guide urging member while the open/close member is positioned in the first closed position and movable to the third open position by the urging force of the second guide urging member when the open/close member is opened in the first open position.

7. The image forming apparatus according to claim 6, wherein the second guide member positioned in the third open position is located above a mounted/demounted locus while the fixing portion is mounted to and demounted from a frame of the main assembly of the image forming apparatus, and wherein the fixing portion is mountable to and demountable from the frame of the main assembly of the image forming apparatus along a horizontal direction while the open/close member is positioned in the first open position.

8. The image forming apparatus according to claim 4, wherein the conveyance passage is a first conveyance passage, and wherein the main assembly of the image forming apparatus includes a reverse conveying portion configured to reverse and convey the sheet conveyed by the fixing portion, a second conveyance passage and a third conveyance passage configured to guide the sheet reversed by the reverse conveying portion toward the transfer roller again.

9. The image forming apparatus according to claim 8, wherein the open/close member is openable and closable between the first closed position and the first open position about a shaft extending in a first direction, and wherein at least a part of the reverse conveying portion is overlapped with the intermediary conveying portion in a second direction perpendicular to a vertical direction and the first direction.

10. The image forming apparatus according to claim 8, wherein the second guide member is movable among the third closed position where the second guide member guides the sheet conveyed by the fixing portion to the first conveyance passage, a fourth closed position where the second guide member guides the sheet conveyed by the fixing portion to the second conveyance passage and the third open position.

11. The image forming apparatus according to claim 8, wherein the first guide member, the second guide member and the open/close member forms the second conveyance passage in a state in which the open/close member is positioned in the first closed position, and wherein the second conveyance passage is opened while the open/close member is positioned in the first open position.

12. The image forming apparatus according to claim 1, wherein the guide member is constituted to be movable to the second open position by operation of a user to the guide member while the open/close member is positioned in the first open position.

13. The image forming apparatus according to claim 12, wherein the open/close member is movable between the first closed position and the first open position about a shaft extending in a first direction, wherein the rotational center of the guide member is disposed at a position further from the open/close member than the center of gravity of the guide member in a second direction perpendicular to the vertical direction and the first direction in a state in which the open/close member is positioned in the first closed position, and wherein the guide member is urged to the second closed position by its own weight when the open/close member is opened from the first closed position to the first open position.

14. The image forming apparatus according to claim 1, wherein the open/close member is movable between the first closed position and the first open position about a shaft extending in a first direction, wherein the rotational center of the guide member is disposed at a position closer to the open/close member than the center of gravity of the guide member in a second direction perpendicular to the vertical direction and the first direction in a state in which the open/close member is positioned in the first closed position, and wherein the guide member is moved from the second closed position toward the second open position by its own weight when the open/close member is opened from the first closed position to the first open position.

15. The image forming apparatus according to claim 1, further comprising an urging member configured to urge the guide member toward the second open position, wherein the guide member is moved from the second closed position toward the second open position by an urging force of the urging member when the open/close member is opened from the first closed position to the first open position.

* * * * *